US010037644B2

(12) United States Patent
Harty

(10) Patent No.: US 10,037,644 B2
(45) Date of Patent: Jul. 31, 2018

(54) AUTOMATED BANKING MACHINE CASSETTE AND CASSETTE MODULE

(71) Applicant: Diebold Nixdorf, Incorporated, North Canton, OH (US)

(72) Inventor: Michael J. Harty, Canton, OH (US)

(73) Assignee: Diebold Nixdorf, Incorporated, North Canton, OH (US)

( * ) Notice: Subject to any disclaimer, the term of this patent is extended or adjusted under 35 U.S.C. 154(b) by 0 days.

(21) Appl. No.: 15/184,063

(22) Filed: Jun. 16, 2016

(65) Prior Publication Data

US 2016/0371911 A1 Dec. 22, 2016

Related U.S. Application Data

(60) Provisional application No. 62/180,402, filed on Jun. 16, 2015.

(51) Int. Cl.
*B65G 59/00* (2006.01)
*B65H 1/00* (2006.01)
(Continued)

(52) U.S. Cl.
CPC ..... *G07D 11/0006* (2013.01); *G07D 11/0012* (2013.01); *G07D 11/0033* (2013.01);
(Continued)

(58) Field of Classification Search
CPC ........... G07D 11/0006; G07D 11/0012; G07D 11/0033; G07D 11/0039; G07D 11/0084;
(Continued)

(56) References Cited

U.S. PATENT DOCUMENTS 4,726,474 A * 2/1988 Arikawa ............ G07D 11/0081 109/24.1
5,000,322 A * 3/1991 Goi .................... G07D 11/0003 209/534
(Continued)

FOREIGN PATENT DOCUMENTS

JP 3247275 B2 1/2002
JP WO 2013084645 A1 * 6/2013 ......... G07D 11/0018
(Continued)

OTHER PUBLICATIONS

Wikipedia page relating to Photoelectric sensor cited in the International Search Report of corresponding PCT application.
(Continued)

*Primary Examiner* — Rakesh Kumar
(74) *Attorney, Agent, or Firm* — Black, McCuskey, Souers & Arbaugh, LPA

(57) ABSTRACT

Described herein are automated banking machine cassette modules and cassettes. The cassette module may include but is not limited to a divert cassette positioned for easy access and a light pipe system for detecting when sheets are entering or leaving a cassette. The cassette may include but Is not limited to a cassette with an ink staining that does not reduce the capacity of the cassette, a torsion spring assembly coupled with a push plate in a cassette, a thumper and feed wheel assembly, and a method of assembling a thumper and feed wheel assembly that provides for proper timing of the feed wheels with the thumper wheels.

5 Claims, 27 Drawing Sheets

(51) Int. Cl.
*G07D 11/00* (2006.01)
*G07F 19/00* (2006.01)

(52) U.S. Cl.
CPC ..... *G07D 11/0039* (2013.01); *G07D 11/0084* (2013.01); *G07F 19/00* (2013.01); *G07F 19/20* (2013.01); *G07F 19/201* (2013.01); *G07F 19/205* (2013.01)

(58) Field of Classification Search
CPC ........ G07F 19/00; G07F 19/20; G07F 19/201; G07F 19/205
USPC ........................................................... 221/92
See application file for complete search history.

(56) References Cited

U.S. PATENT DOCUMENTS

| | | | | | |
|---|---|---|---|---|---|
| 5,076,441 | A * | 12/1991 | Gerlier | G07D 11/0006 209/534 |
| 5,984,177 | A * | 11/1999 | Do | G07D 11/0081 235/379 |
| 6,000,555 | A * | 12/1999 | Anma | G07D 11/0081 209/534 |
| 7,249,707 | B2 * | 7/2007 | Yokoi | G07D 11/0012 235/379 |
| 7,976,005 | B2 * | 7/2011 | Ichikawa | B65H 31/24 271/3.01 |
| 8,256,624 | B2 * | 9/2012 | Doi | G07D 11/0018 194/206 |
| 8,276,901 | B2 * | 10/2012 | Taniguchi | B65H 29/006 194/206 |
| 8,292,087 | B2 * | 10/2012 | Nagura | G07D 11/0018 194/206 |
| 8,336,715 | B2 * | 12/2012 | Koga | G07D 11/0084 194/206 |
| 9,027,729 | B2 * | 5/2015 | Furuichi | G07D 11/0084 194/206 |
| 9,027,918 | B2 * | 5/2015 | Komatsu | B65H 31/24 271/162 |
| 9,067,745 | B2 * | 6/2015 | Komatsu | B65H 31/10 |
| 9,234,379 | B2 * | 1/2016 | Togiya | G09F 3/03 |
| 9,266,693 | B2 * | 2/2016 | Hashimoto | G07D 11/0006 |
| 9,424,705 | B1 * | 8/2016 | Ito | G07D 11/0084 |
| 2004/0016621 | A1 * | 1/2004 | Jenrick | G07D 11/0003 194/206 |
| 2004/0169074 | A1 * | 9/2004 | Washington | G06Q 20/1085 235/379 |
| 2005/0006458 | A1 * | 1/2005 | Wanibe | G07D 7/00 235/379 |
| 2005/0010525 | A1 * | 1/2005 | Ross | G06K 7/0008 705/43 |
| 2007/0125845 | A1 * | 6/2007 | Martin | B65H 3/0816 235/381 |
| 2007/0138258 | A1 * | 6/2007 | Magee | G07F 19/20 235/379 |
| 2007/0162184 | A1 * | 7/2007 | Pinney | G06F 19/3462 700/241 |
| 2008/0290595 | A1 * | 11/2008 | Fujita | G07D 11/0081 271/278 |
| 2010/0200448 | A1 * | 8/2010 | Doi | G07D 9/00 206/459.1 |
| 2010/0206689 | A1 * | 8/2010 | Oba | G07D 11/0018 194/207 |
| 2012/0104679 | A1 * | 5/2012 | Blair | B65H 1/266 271/9.13 |
| 2012/0261874 | A1 * | 10/2012 | Arikata | G07D 11/0081 271/9.01 |
| 2013/0161385 | A1 * | 6/2013 | Graef | G07F 19/202 235/379 |
| 2013/0247799 | A1 * | 9/2013 | Furuichi | G07D 11/0084 109/23 |
| 2014/0144749 | A1 * | 5/2014 | Iwasaki | G07D 11/0081 194/206 |
| 2015/0302679 | A1 * | 10/2015 | Iizuka | B65H 31/22 271/207 |
| 2015/0363991 | A1 * | 12/2015 | Yoon | G07D 11/006 700/232 |
| 2015/0379799 | A1 * | 12/2015 | Kim | G07D 11/0006 194/350 |
| 2016/0371911 | A1 * | 12/2016 | Jones | G07D 11/0006 |
| 2017/0140598 | A1 * | 5/2017 | Muta | B65H 3/063 |
| 2017/0249807 | A1 * | 8/2017 | Kanbayashi | G07F 19/202 |

FOREIGN PATENT DOCUMENTS

| | | | |
|---|---|---|---|
| WO | WO2012066730 | A1 | 5/2012 |
| WO | WO2013084645 | A1 | 6/2013 |

OTHER PUBLICATIONS

International Search Report and Written Opinion of corresponding PCT application.
Machine translation of Abstract for JP3247275.
Machine translation of Abstract for WO2012066730.

* cited by examiner

AUTOMATED BANKING MACHINE CASSETTE AND CASSETTE MODULE

CROSS REFERENCE TO RELATED APPLICATIONS

This application claims the benefit under 35 U.S.C. § 119 of U.S. Provisional Application No. 62/180,402 filed Jun. 16, 2015, the contents of which are hereby incorporated by reference in their entirety.

TECHNICAL FIELD

The present disclosure relates generally to cassettes employed by automated banking machines to dispense cash.

BACKGROUND

Automated banking machines, such as an automated teller machine ("ATM") provide a convenient way or banking customers to obtain cash at any time. Cash is stored inside the ATM in cassettes. Different cassettes may contain different denominations of currency notes.

BRIEF DESCRIPTION OF THE DRAWINGS

The accompanying drawings incorporated herein and forming a part of the specification illustrate the example embodiments.

OVERVIEW OF EXAMPLE EMBODIMENTS

Figure 1:
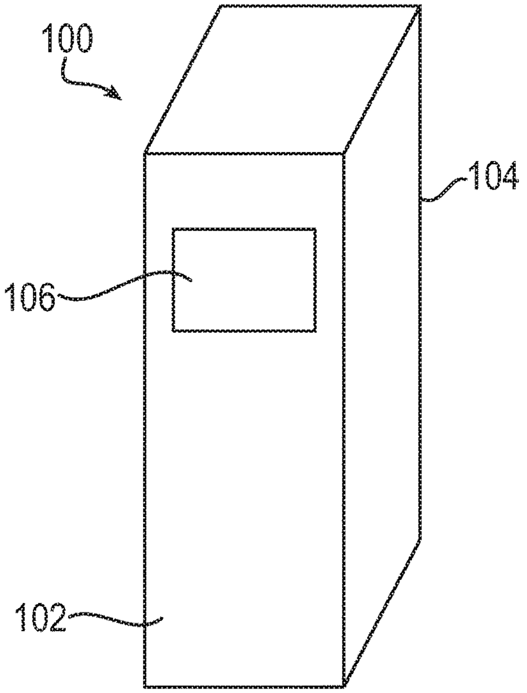
FIG. 1 illustrates an example of an automated banking machine upon which an example embodiment may be implemented.

The following presents a simplified overview of the example embodiments in order to provide a basic understanding of some aspects of the example embodiments. This overview is not an extensive overview of the example embodiments. It is intended to neither identify key or critical elements of the example embodiments nor delineate the scope of the appended claims. Its sole purpose is to present some concepts of the example embodiments in a simplified form as a prelude to the more detailed description that is presented later.

Described herein are automated banking machine cassette modules and cassettes. The cassette module may include but is not limited to a divert cassette positioned for easy access and a light pipe system for detecting when sheets are entering or leaving a cassette. The cassette may include, but is not limited to, a cassette with an ink staining that does not reduce the capacity of the cassette, a torsion spring assembly coupled with a push plate in a cassette, a thumper and feed wheel assembly, and a method of assembling a thumper and feed wheel assembly that provides for proper timing of the feed wheels with the thumper wheels.

Description of Example Embodiments

This description provides examples not intended to limit the scope of the appended claims. The figures generally indicate the features of the examples, where it is understood and appreciated that like reference numerals are used to refer to like elements. Reference in the specification to "one embodiment" or "an embodiment" or "an example embodiment" means that a particular feature, structure, or characteristic described is included in at least one embodiment described herein and does not imply that the feature, structure, or characteristic is present in all embodiments described herein.

FIG. 1 illustrates an example of an automated banking machine 100 upon which an example embodiment may be implemented. The automated banking machine 100 includes a front side 102 and a rear side 104. The automated banking machine 100 comprises a user interface 106 allowing a user to operate the machine. Examples of components that may be present on an user interface, include but are not limited to, any one of, or combination of, a display, a keypad, a touch screen display, a card reader, a wireless reader, a cash dispenser, a cash recycler, a deposit acceptor (e.g., a cash acceptor, or a check acceptor).

Figure 2:
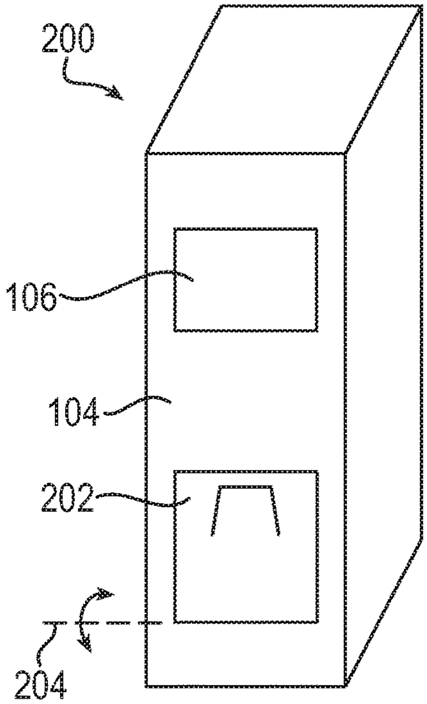
FIG. 2 illustrates an example of an automated banking machine with a front access door.

FIG. 2 illustrates an example of an automated banking machine 200 with a front access door 202. In the illustrated example, the front access door 202 is illustrated in the closed position and is operable to rotate about a horizontal axis 204 at the bottom of the front access door 202. As those skilled in the art can readily appreciate, the front access door 202 may be configured to rotate about any physically realizable axis, thus the example embodiments described herein should not be considered as limited to the illustrated example of the front access door 202 rotating about a horizontal axis along the bottom of the door. The front access door 202 provides access to the interior of the automated banking machine 200. As will be described in further detail herein, an ATM universal core module, which will be described in more detail herein, may be installed in the interior of the automated bank. The ATM universal core module may be accessed via front access door 202.

Figure 3:
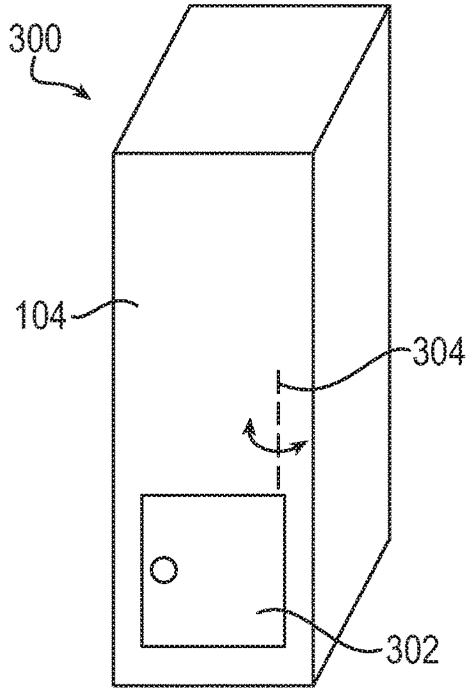
FIG. 3 illustrates an example of an automated banking machine with a rear access door.

FIG. 3 illustrates an example of an automated banking machine 300 with a rear access door 302 for accessing the interior of the automated banking machine 300. In the illustrated example, the rear access door 302 is illustrated in the closed position and is operable to rotate about a vertical axis 304. As those skilled in the art can readily appreciate, the rear access door 302 may be configured to rotate about any physically realizable axis, thus the example embodiments described herein should not be considered as limited to the illustrated example of the rear door 302 rotating about a vertical axis along the top of the door. As those skilled in the art can readily appreciate, automated banking machine 100 in FIG. 1 may be configured like automated banking machine 200 illustrated in FIG. 2 or automated banking machine 300 illustrated in FIG. 3.

Figure 4:
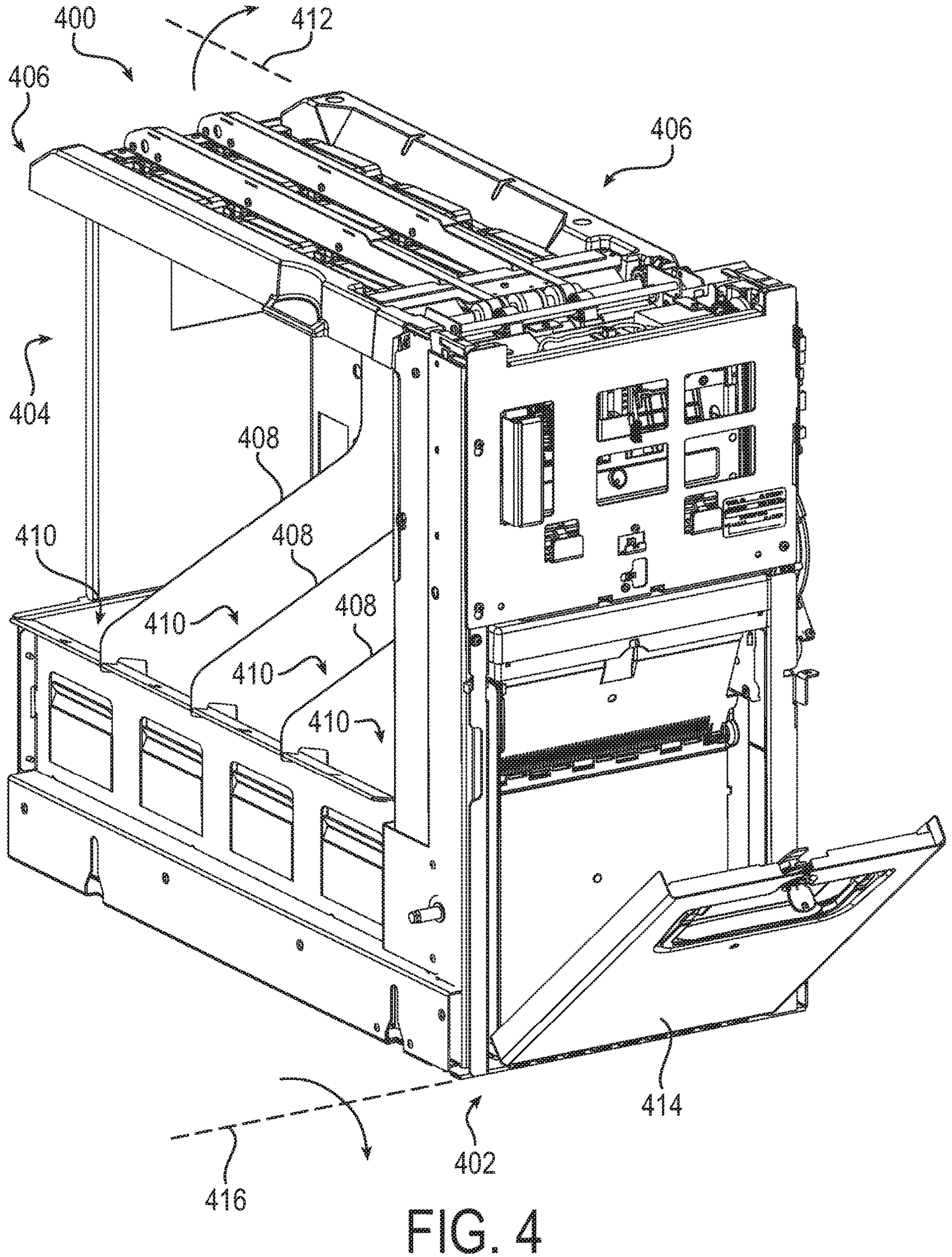
FIG. 4 is a perspective view of a cassette module with a divert cassette that allows for removal of the contents without removing the cassette.

FIG. 4 is a perspective view of a cassette module 400 with a divert cassette 402 that allows for removal of sheets, such as currency notes, without removing the divert cassette 402 from the cassette module 400. As used herein a divert cassette 402 means any cassette that can either hold notes diverted from the customer (e.g., notes diverted from the upper assembly 406 such as mis-picked notes, double notes, and/or notes from a stack that cannot be properly validated), hold notes that have been retracted after being presented to the customer (e.g., the customer does not take the stack of notes, or only takes some but not all of the notes), or a combination divert and retract cassette that in particular embodiments has separate compartments for diverted notes and retracted notes.

The cassette module 400 comprises a lower assembly 404 and an upper assembly 406. Fins 408 form slots 410 for holding the cassettes (not shown, see e.g., FIGS. 19-22). To install or remove a cassette, the upper assembly 406 is rotated about axis 412. The divert cassette comprises a door 414 that is opened by rotating along axis 416.

Figure 5:
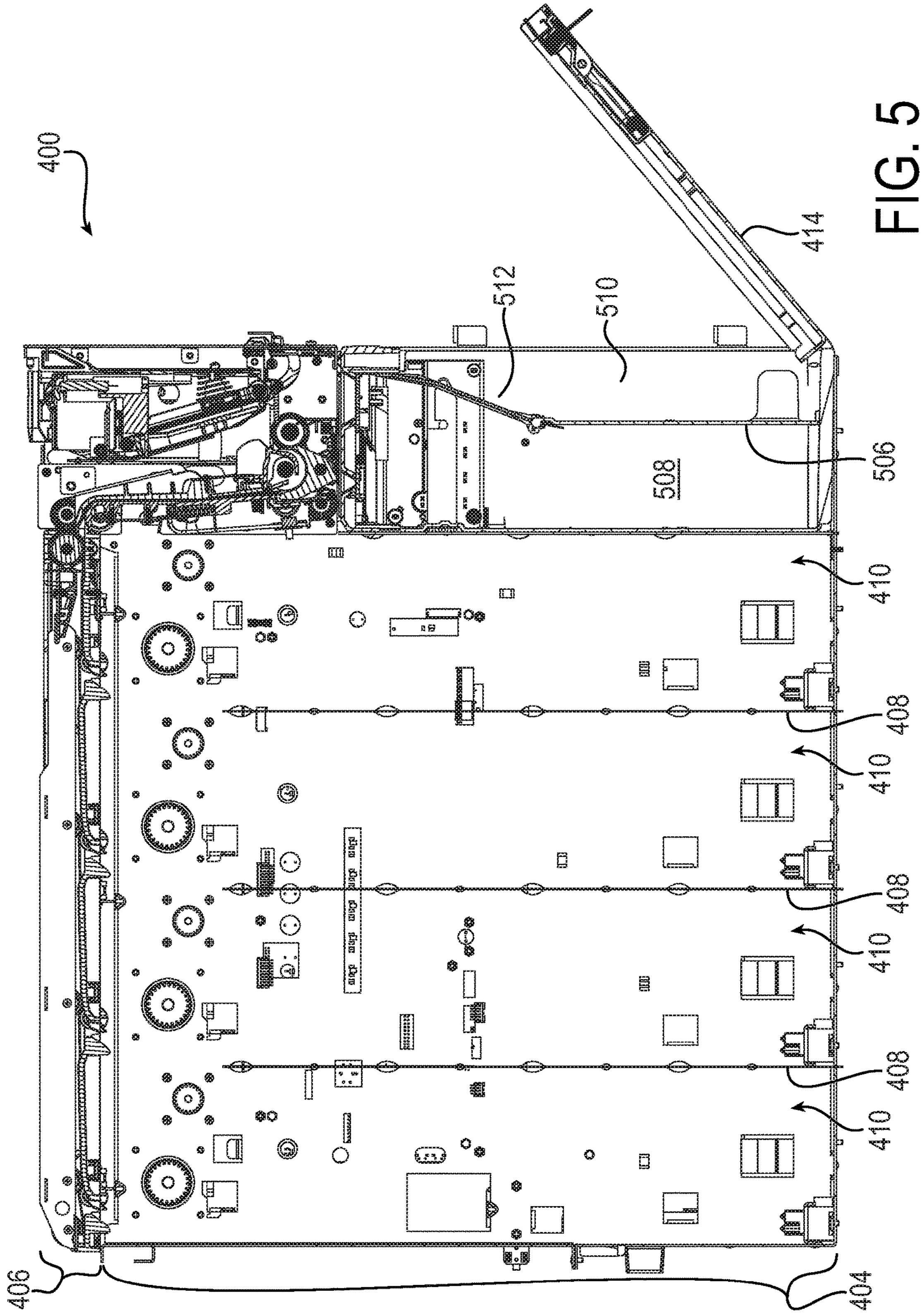
FIG. 5 is a side view of a cassette module illustrated in FIG. 4.

FIG. 5 is a side view of a cassette module 400 illustrated in FIG. 4. As can be observed in this view, the lower assembly 404 comprises gears that are operable to engage the cassettes when inserted into a slot 410. In an example embodiment, sheets, such as currency notes, that are picked from a cassette within cassette module 400 travel along a transport path (describe herein infra, see e.g., FIG. 16) located on the upper assembly 406. Notes that are diverted or retracted from the transport path are directed to the divert cassette 402.

In the illustrated example, the divert cassette 402 comprises two compartments 508, 510 separated by a separator 506. One (first) compartment 508 is for diverted notes (e.g., notes that are diverted from the upper assembly 406 for reasons such as mis-picked notes or doubles) and another (second) compartment 510 is for retracted notes (notes presented to a customer outside of the automated banking machine 100 who did not take some or all of the notes). Valve 512 is employed to direct notes to the proper compartment. However, those skilled in the art can readily appreciate that in other embodiments, the diverter cassette may only have one chamber, or as many chambers as is physically realizable so the example embodiments should not be considered as limited by the illustrated example. In another example embodiment, compartment 508 is employed to hold retracted notes and compartment 510 is employed to hold diverted notes.

Figure 6:
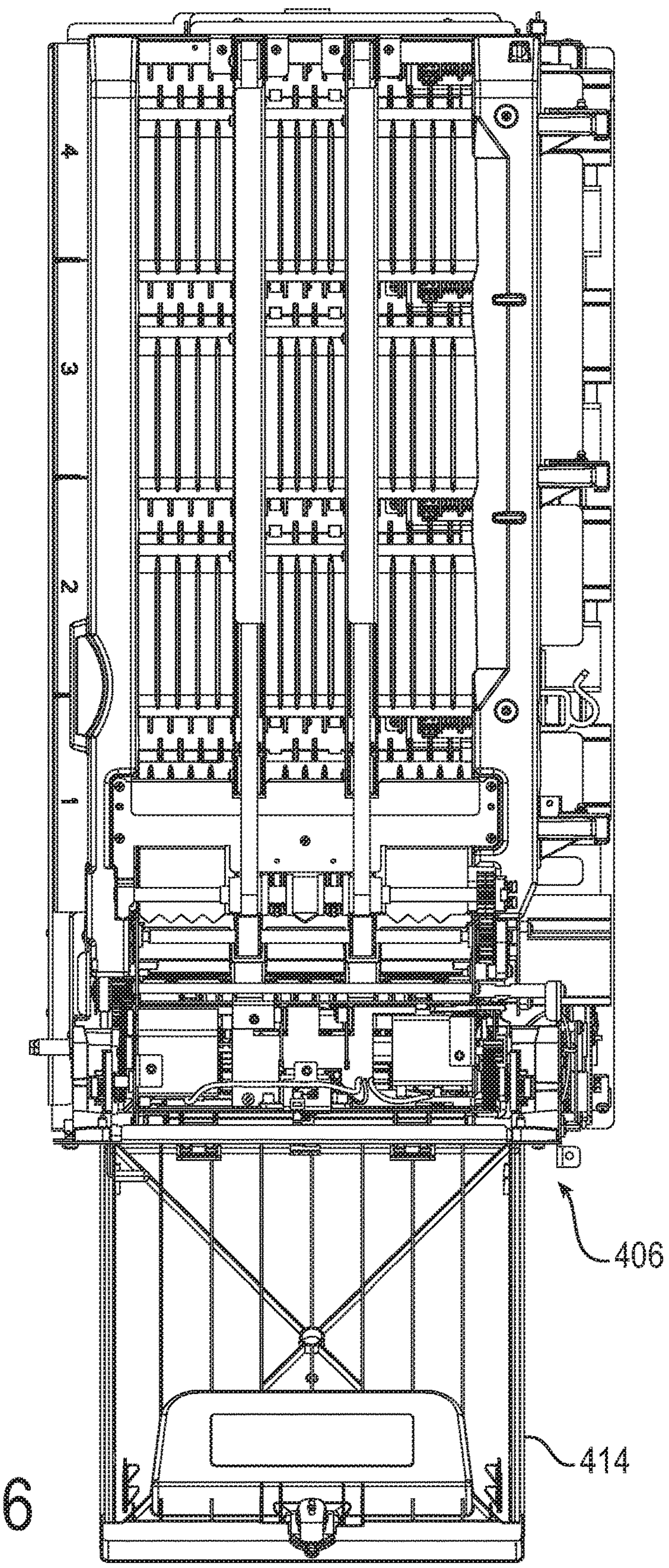
FIG. 6 is a top view of a cassette module illustrated in FIG. 4.

FIG. 6 is a top view of a cassette module 400 illustrated in FIG. 4. This view illustrates the upper assembly 406 in the closed position and the door 414 in an open position.

Figure 7:
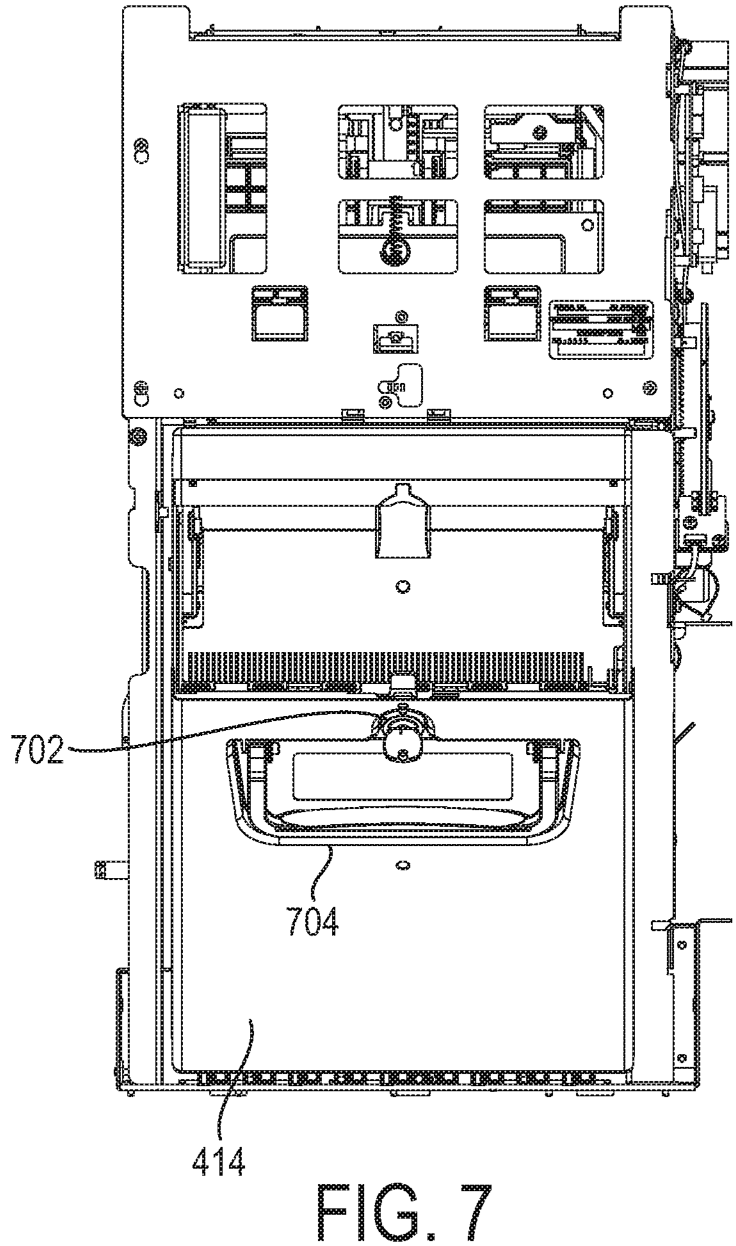
FIG. 7 is a front view of the cassette module illustrated in FIG. 4.

FIG. 7 is a front view of the cassette module 400 illustrated in FIG. 4. The door 414 of the diverter cassette comprises a lock 702 and a handle 704 for securing and opening the door 414 to the divert cassette 402.

Figure 8:
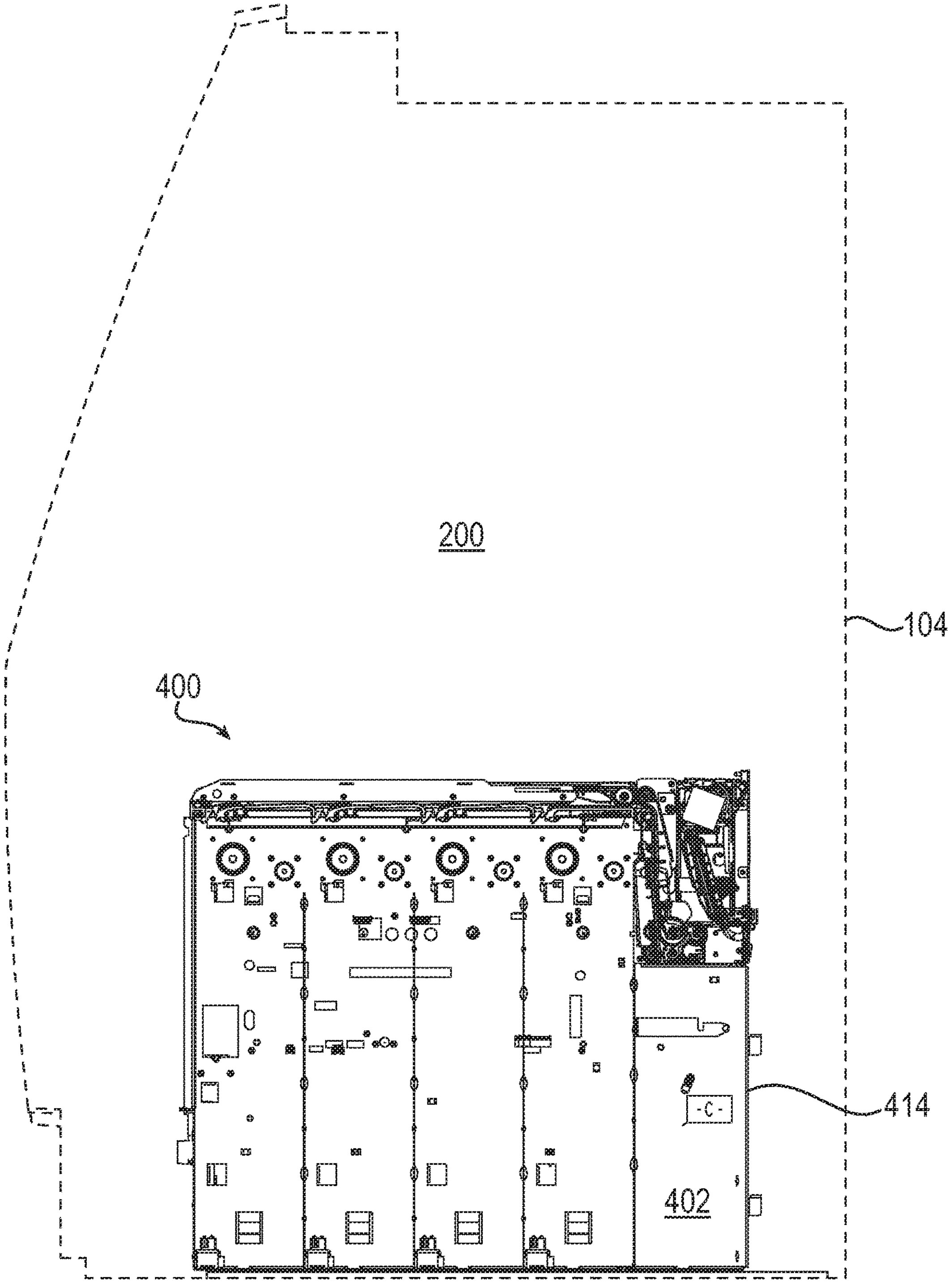
FIG. 8 illustrates an example of the cassette module illustrated in FIG. 4 in an operational position inside of an automated banking machine.

FIG. 8 illustrates an example of the cassette module illustrated in FIG. 4 in an operational position inside of an automated banking machine 200. In the illustrated example, the automated banking machine 200 has a rear service door, however, those skilled in the art should readily appreciate the principles described herein are suitably adaptable to an automated banking machine with a front service door, such as automated banking machine 200 illustrated in FIG. 2.

Figure 9:
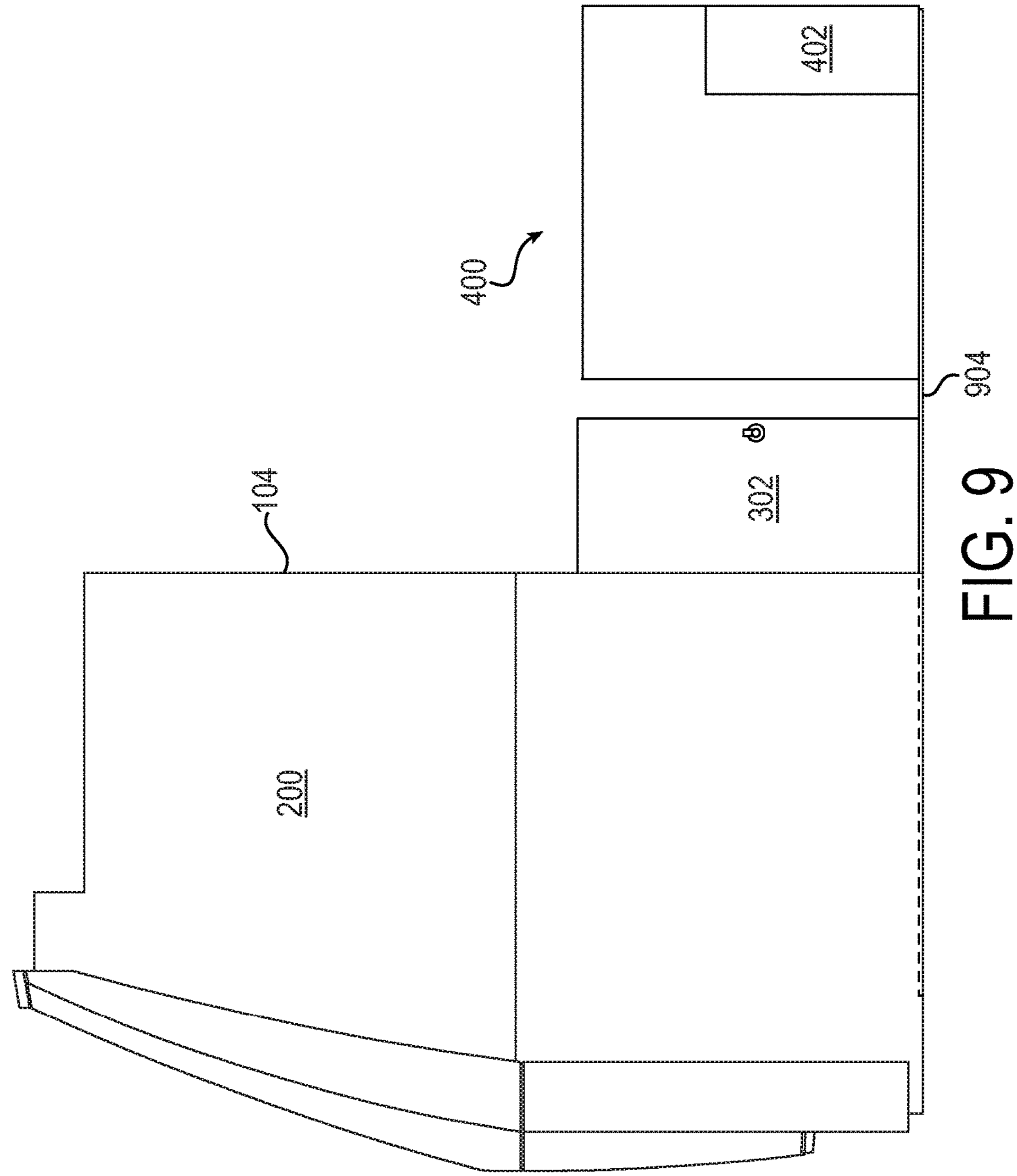
FIG. 9 illustrates an example of the cassette module illustrated in FIG. 4 in a service position outside of an automated banking machine.

FIG. 9 illustrates an example of the cassette module illustrated in FIG. 4 in a service position outside of the automated banking machine 200. The (rear) service door 302 is in the opened position. The cassette module 400 is mounted on slide 904 to remove the cassette module 400 from the interior of the automated banking machine 200. Slide 904 may suitably comprise a plurality of slides that are operable to retract and allow the cassette module 400 to be slid back into the interior of automated banking machine 200.

Figure 10:
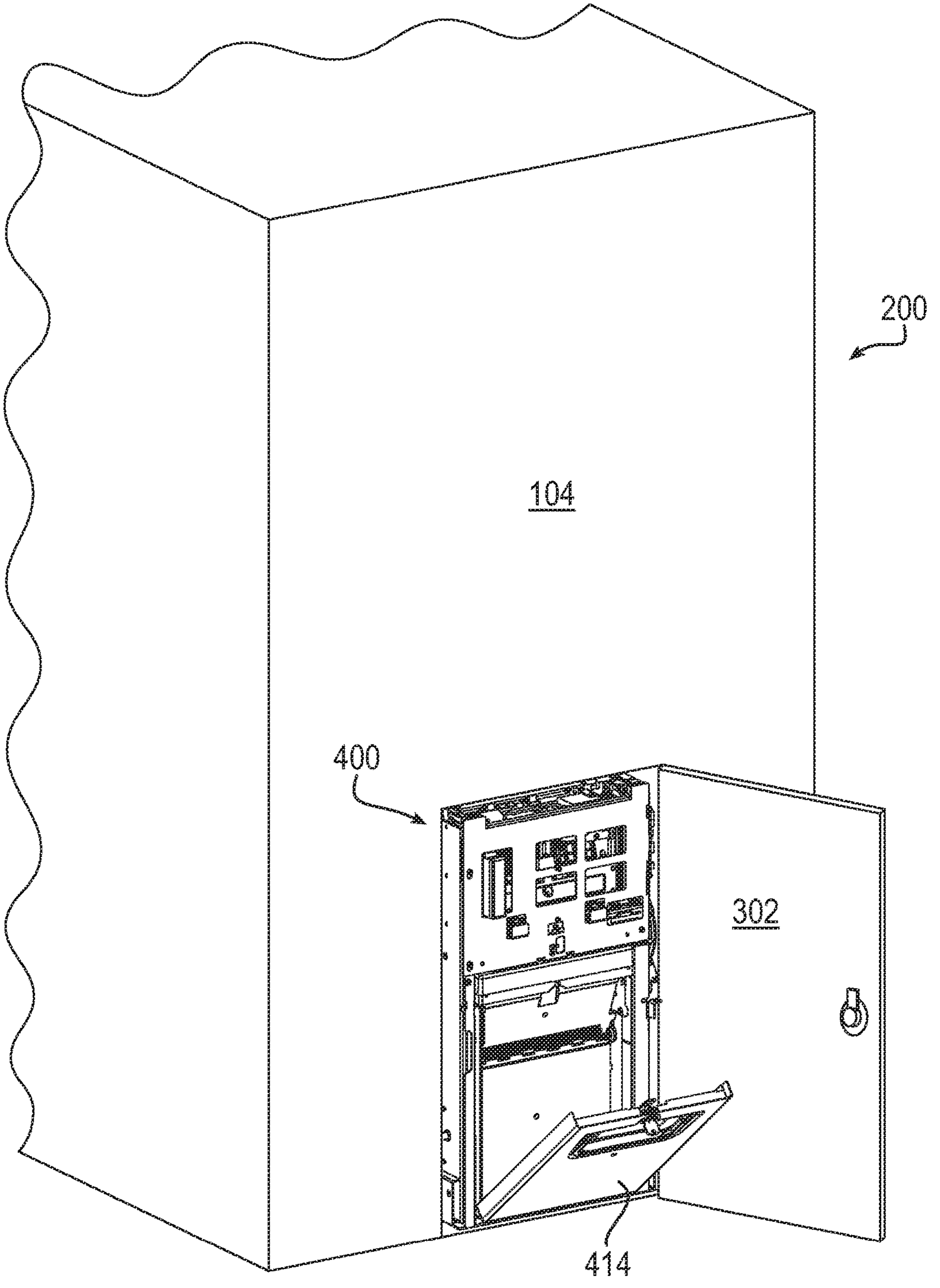
FIG. 10 illustrates an example of the cassette module illustrated in FIG. 4 in an operational position inside of an automated banking machine with a service door in an open position and a door to the divert cassette in the open position.

FIG. 10 illustrates an example of the cassette module illustrated in FIG. 4 in an operational position inside of an automated banking machine 200 with a service door 302 in an open position and a door 414 of the divert cassette 402 in the open position. This illustrates an aspect of an example embodiment where the divert cassette 402 may be accessed without having to remove the cassette module 400

Figure 11:
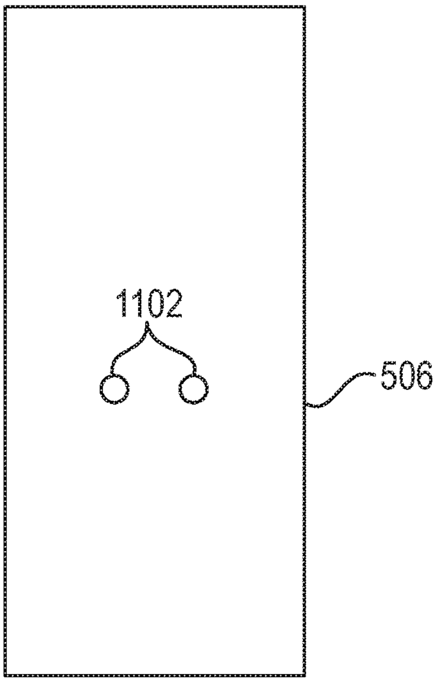
FIG. 11 is a front view of a separator for the divert cassette.
Figure 12:
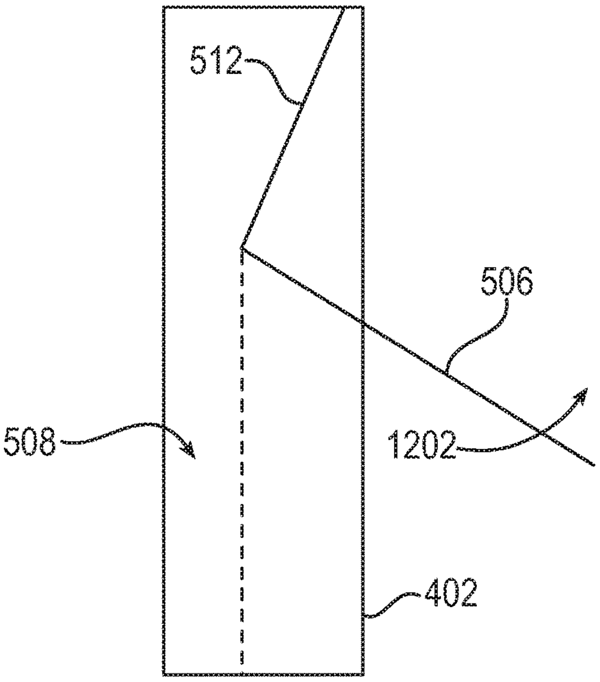
FIG. 12 illustrates an example of the separator in the divert cassette in the open position.

FIG. 11 is a front view of a separator 506 for divert cassette 402. The separator 506 has finger holes 1102 allowing a service person to rotate the separator to gain access into the divert compartment 508, FIG. 12 illustrates an example of the separator 506 being rotated in direction 1202 to gain access into the divert compartment 508.

In an example embodiment, the cassette module 400 illustrated in FIGS. 4-7 can be employed by either of automated banking machine 200 or automated banking machine 300. This is accomplished by mounting the appropriate hardware on top of the upper assembly 406 to transport notes from the cassettes in the cassette module 400 to the user interface. The cassette module 400 is installed so that divert cassette 402 is aligned with the door for accessing the interior of the automated banking machine (e.g., door 202 in FIG. 2 or door 302 in FIG. 3).

Figure 13:
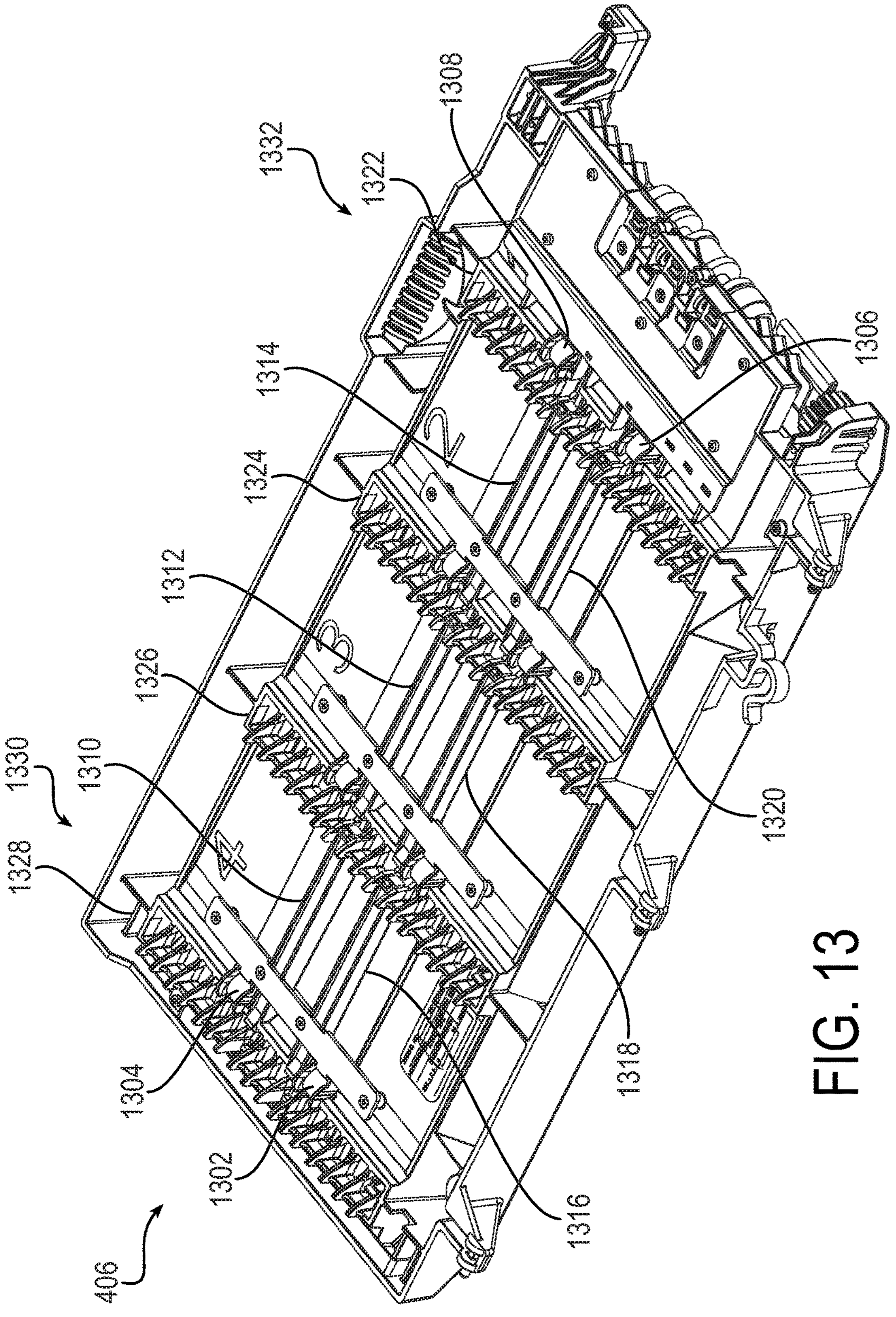
FIG. 13 illustrates a view of the upper assembly of the cassette module that includes a light pipe system for sensing sheets moving to or from a cassette.

FIG. 13 illustrates a view of the upper assembly 406 of the cassette module that includes a light pipe system for sensing sheets, such as currency notes, moving to or from a cassette within the cassette module 400. In an example embodiment, the light pipe system comprises two emitters 1302, 1304 optically coupled with two detectors 1306, 1308 respectively.

In an example embodiment, emitter 1304 is optically coupled with detector 1308 via light pipes 1310, 1312, 1314. Emitter 1302 is coupled with detector 1306 via light pipes 1316, 1318, 1320. In the illustrated example, the top assembly has four channels 1322, 1324, 1326, 1328 that corresponds to four currency note cassettes (not shown). When a bill is either extracted or inserted into a selected cassette, the bill passes through the path between the emitters 1302, 1304 and detectors 1306, 1308. An aspect of the illustrated embodiment is that emitter/detector pairs can be employed to monitor multiple gaps as opposed to emitter/detector pairs for every channel 1322, 1324, 1326, 1328. Thus, the illustrated example reduces the number of emitter/detector pairs from eight to four.

In an example embodiment, the emitters 1302 and 1304 emit light having narrow beam widths, or narrow bands, that are detected at a sufficient intensity by only one of detectors 1306, 1308 respectively (e.g., light from emitter 1302 is detected by detector 1306 but not detector 1308 and light from emitter 1304 is detected by detector 1308 but not detector 1306). For example, the emitters 1302, 1304 may emit a laser light. As another example, the emitters 1304, 1304 may employ collimating lenses (not shown) to focus the lights into narrow beams. In this embodiment, light pipes 1310, 1312, 1314, 1316, 1318, and 1320 can be eliminated.

In the illustrated examples, emitters 1302, 1304 are located at a first end 1330 of the upper assembly 406 and detectors 1306, 1308 are located at an opposite end 1332 of the upper assembly 406. Those skilled in the art should readily appreciate the emitters 1302, 1304 and the detectors 1306, 1308 may be located anywhere as long as they beams traverse channels 1322, 1324, 1326, and 1328. Moreover, those skilled in the art should also appreciate that the location of the emitters 1302, 1304 and detectors 1306, 1308 are interchangeable. For example emitter 1302 and/or emitter 1304 can be located at end 1332 while emitter 1306 and/or 1308 respectively can be located at end 1330.

Figure 14:
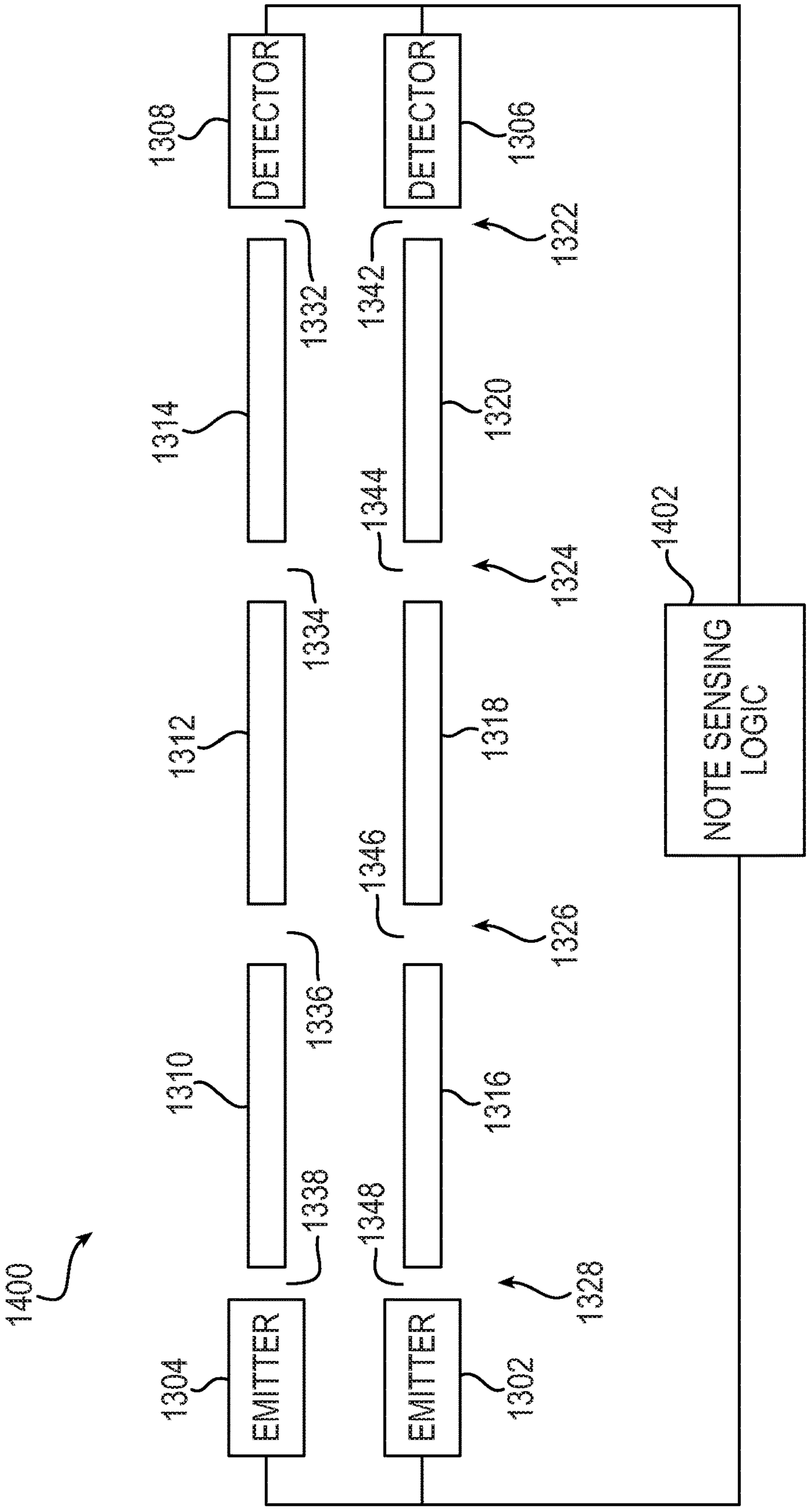
FIG. 14 illustrates a detailed view of the light pipe system for sensing sheets.

FIG. 14 illustrates a detailed view of the light pipe system 1400 for note sensing. The light pipe system 1100 is suitable for implementing the light pipe system described in FIG. 13 supra.

In an example embodiment, light is transmitted from emitter 1304 and is directed to detector 1308. If there is nothing blocking the optical path, the light from emitter 1304 passes through gap 1338 (channel 1328), light pipe 1310, gap 1336 (channel 1326), light pipe 1312, gap 1334 (channel 1324), light pipe 1314, and gap 1332 (channel 1322) to detector 1308.

In an example embodiment, light is transmitted from emitter 1302 and is directed to detector 1306. If there is nothing blocking the optical path, the light from emitter 1302 passes through gap 1348 (channel 1328), light pipe 1316, gap 1346 (channel 1326), light pipe 1318, gap 1344 (channel 1324), light pipe 1320, and gap 1342 (channel 1322) to detector 1306.

In an example embodiment, note sensing logic 1402 is coupled with emitters 1302, 1304 and detectors 1306, 1308. "Logic", as used herein, includes but is not limited to hardware, firmware, software and/or combinations of each to perform a function(s) or an action(s), and/or to cause a function or action from another component. For example, based on a desired application or need, logic may include a software controlled microprocessor, discrete logic such as an application specific integrated circuit (ASIC), a programmable/programmed logic device, memory device containing instructions, or the like, or combinational logic embodied in hardware. Logic may also be fully embodied as software that performs the desired functionality when executed by a processor.

In an example embodiment, the note sensing logic 1402 is operable to control the operation of emitters 1302, 1304 and obtain signals from detectors 1306, 1308 that indicate whether the detectors 1306, 1308 are receiving signals from emitters 1302, 1304 respectively. This can allow the note sensing logic 1402 to determine whether any of channels 1322, 1324, 1326, and/or 1328 are blocked. For example, when a sheet is being moved into or out of a cassette from the transport path (not shown, see e.g., 1610 in FIG. 16), transport path will be blocked for a short period of time while the sheet passes through the channel. If the sheet becomes stuck, the transport path will remain blocked and a fault condition is determined to exist. Similarly, if the note sensing logic 1402 does not detect a blockage between the emitters and detectors, this would indicate a sheet did not pass through a channel, and thus a fault condition is determined. In response to the fault condition, the note sensing logic 1402 may try to take corrective actions to clear the channel, cassette, and/or transport path. In response to the fault condition, the note sensing logic 1402 can send any notes that were picked and are either stacked or on the transport path to a divert cassette (not shown, see e.g., divert cassette 402 in FIG. 4). The note sensing logic 1402 can determine which channel is blocked on which cassette was supposed to receive or dispense a sheet.

In the illustrated examples there are two gaps per channel are employed for detecting when notes are entering or leaving a cassette. However, those skilled in the art should readily appreciate that any desired number of emitter/detector pairs, which correspond to a number of gaps per channel, may be employed for detecting when notes are entering or leaving a cassette.

Figure 15:
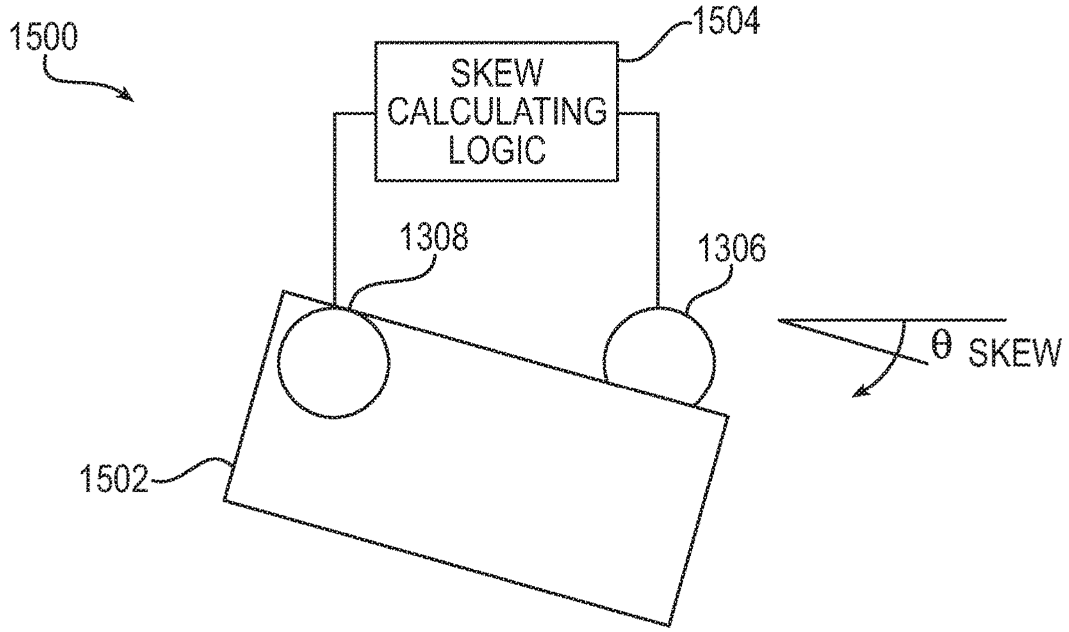
FIG. 15 illustrates an example of the detectors of the light pipe system operable to calculate skew of a sheet being moved from a cassette to the upper assembly for transport.

FIG. 15 illustrates an example of the detectors of a light pipe system 1500 enabling to calculating the skew angle (θ) of a note 1502 being moved between a cassette to the upper assembly 406. As the sheet (or currency note) passes through a channel, it blocks the signals to detectors 1306, 1308. Because of the notes skew, the signals to detectors 1306, 1308 will not be blocked at the same time. The detectors 1306, 1308 send a signal to skew calculating logic 1504 indicating when they are receiving a signal from their emitter (e.g. emitters 1302, 1304 respectively), or alternatively when they are not receiving a signal. Thus, based on the time difference between when the note blocked detector 1306 and when the note blocked detector 1308, the skew calculating logic 1504 can determine the skew of the note. In an example embodiment, the skew may be implemented with note sensing logic 1402 described in FIG. 14.

Figure 16:
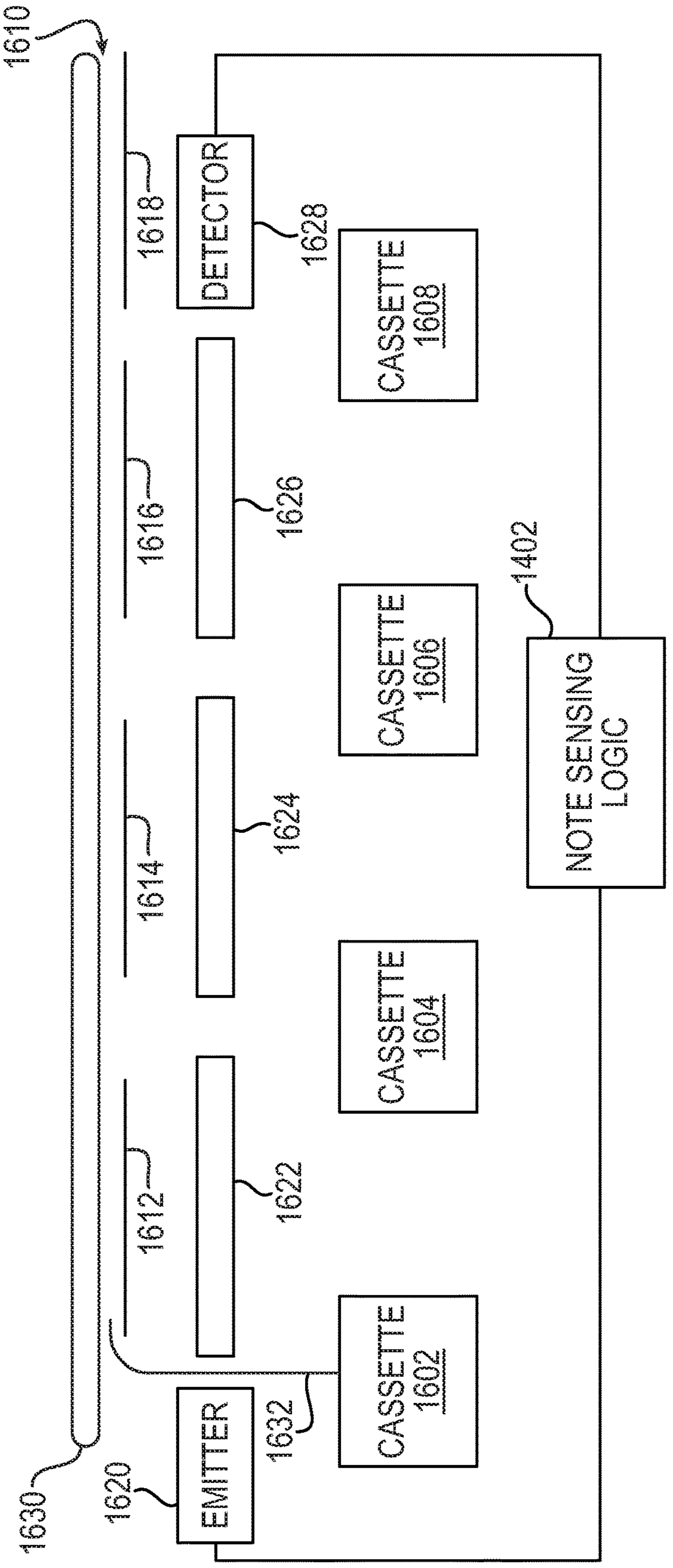
FIG. 16 illustrates a side view of the cassette module with a light pipe system.

FIG. 16 illustrates an exploded side view of cassette module with a light pipe system. In the illustrated example, the cassette module comprises four cassettes 1602, 1604, 1606, 1608, and a transport path 1610 that comprises surfaces 1612, 1614, 1616, and 1618, and a light pipe system comprising an emitter 1620, light pipes 1622, 1624, 1626, and detector 1628 that is located between cassettes 1602, 1604, 1606, 1608 and the transport path 1610. In the illustrated example, a belt 1630 is employed to move notes along the transport path 1610, however, those skilled in the art should readily appreciate that any suitable technique for moving notes along the transport path 1610 may be employed.

In the illustrated example, a note 1632 is moving between cassette 1602 and the transport path 1610. While a portion of the note 1632 is between the cassette 1602 and the transport path 1610, light from emitter 1620 is blocked and prevented from reaching detector 1628.

Figure 17:
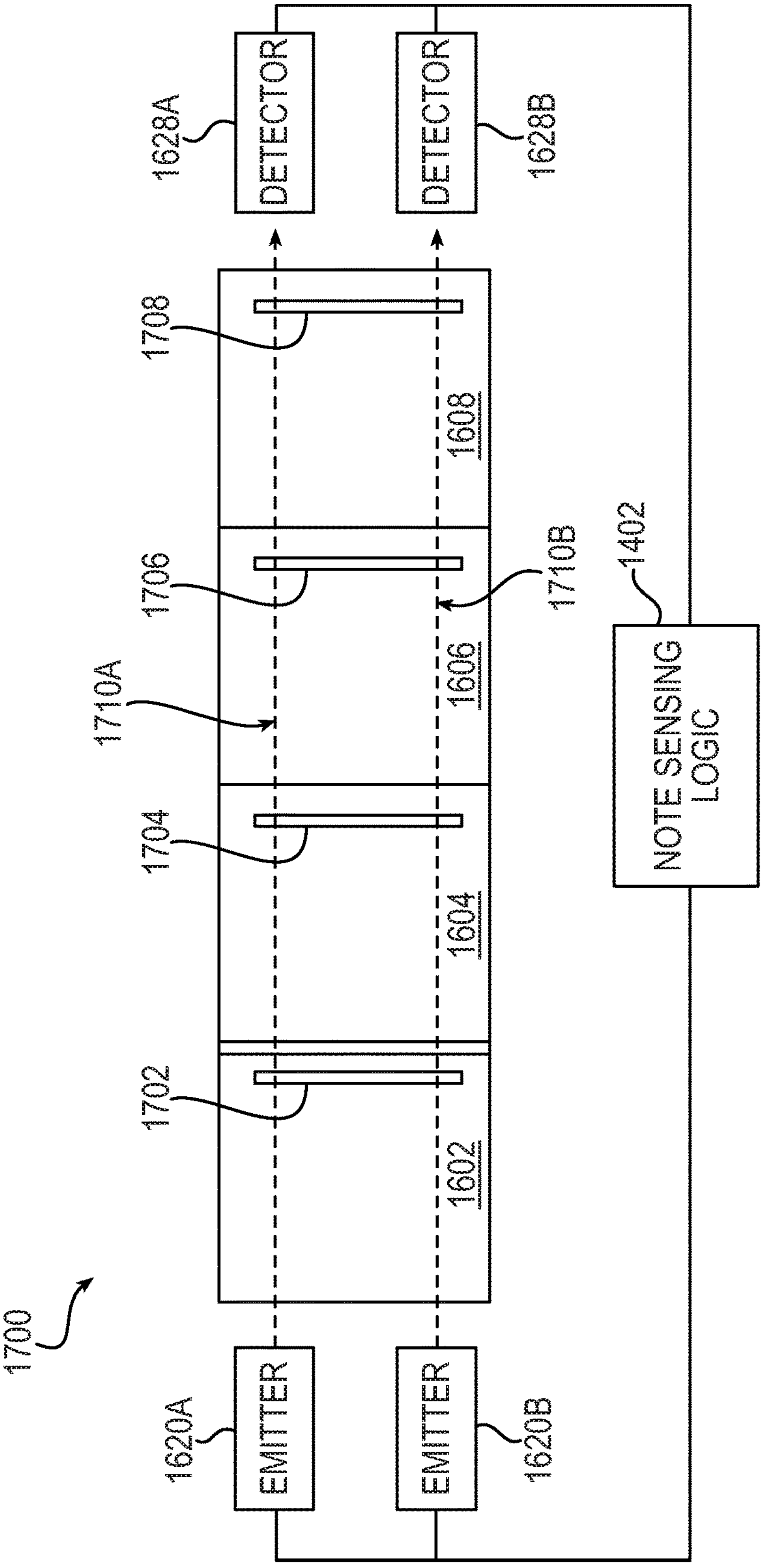
FIG. 17 illustrates an example of a top view of the upper assembly of the cassette module that employs a light system for sensing sheets moving to or from a cassette that does not employ light pipes.

FIG. 17 illustrates an example of a top view of the upper assembly 406 of the cassette module 400 that employs a light system 1700 for sensing sheets moving to or from a cassette that does not employ light pipes. The cassettes 1602, 1604, 1606, 1608 have openings 1702, 1704, 1706, 1708 for dispensing and/or receiving sheets (or currency notes). Emitter 1620A emits a signal 1710A that is detected by detector 1628A, and emitter 1602B emits a signal 1720B that is detected by detector 1628B. Emitters 1620A, 1620B may employ any suitable technique for sending a narrow signal to detectors 1628A, 1628B respectively. For example, emitters 1620A, 1620B may employ lasers. As another example, emitters 1620A, 1620B may employ collimating lenses. As still yet another example, emitters 1620A, 1620B may employ different wavelengths and detectors 1628A, 1628B may be configured to detect signals within a narrow band. As those skilled in the art can readily appreciate, the light system 1700 can monitor several channels at once. The illustrated example employs two emitter/detector pairs which can also allow for skew detection, but those skilled in the art should readily appreciate that as few as one emitter/detector pair may be employed or as many emitter/detector pairs that are physically realizable may be employed.

Figure 18:
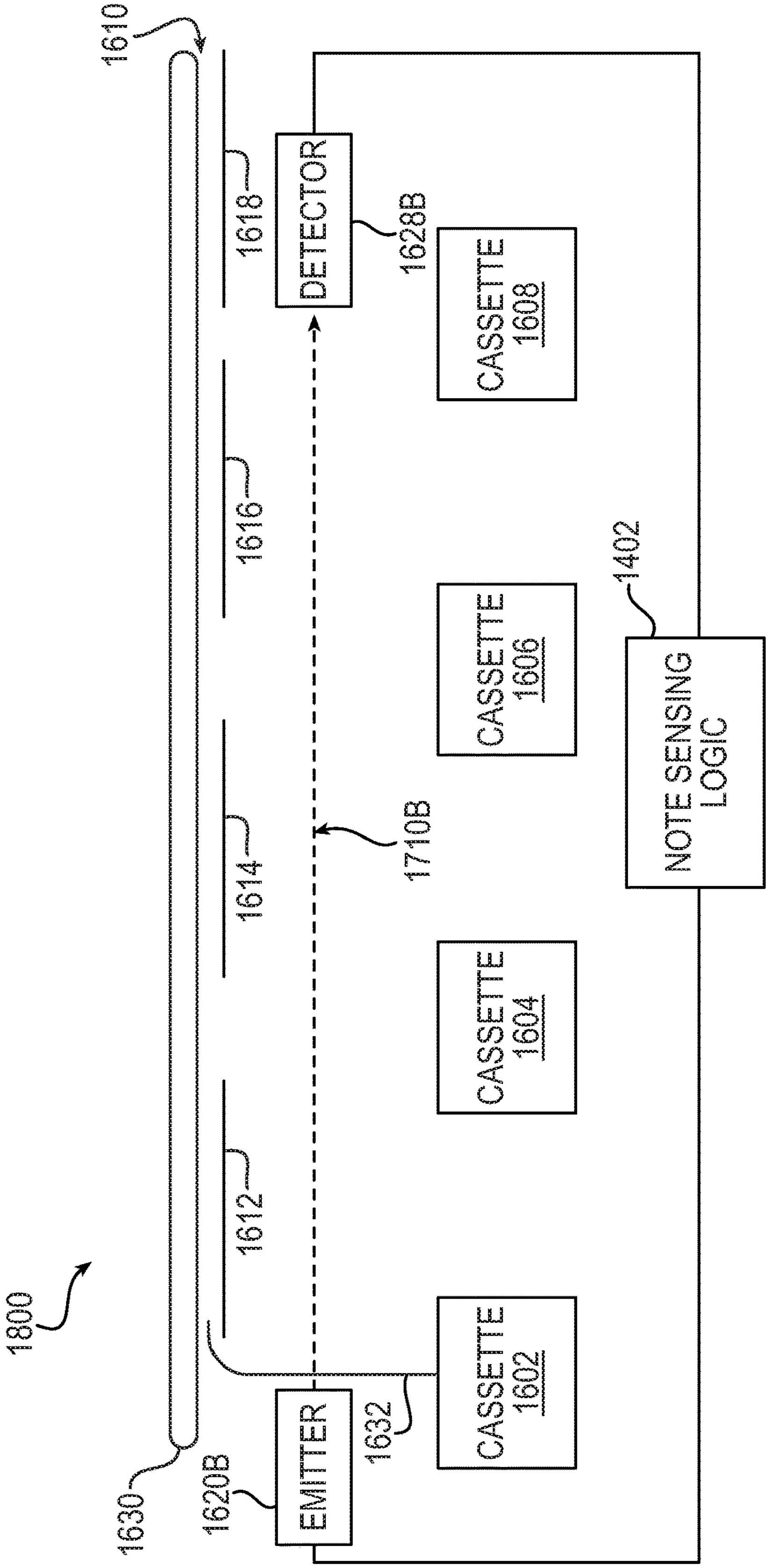
FIG. 18 is a side view of the light system for sensing sheets moving to or from a cassette that does not employ light pipes.

FIG. 18 is a side view of the light system 1800 for sensing sheets moving to or from a cassette that does not employ light pipes. In the illustrated example, the cassette module comprises four cassettes 1602, 1604, 1606, 1608, and a transport path 1610 that comprises surfaces 1612, 1614, 1616, and 1618. An emitter 1620B emits a signal 1710B, such as a light signal, that is received by detector 1628B when the path between the emitter 1710B and detector 1628B is not blocked. Because this is a narrow beam system, there are no light pipes. In the illustrated example, a belt 1630 is employed to move notes along the transport path 1610, however, those skilled in the art should readily appreciate that any suitable technique for moving notes along the transport path 1610 may be employed.

In the illustrated example, a note 1632 is moving between cassette 1602 and the transport path 1610. While a portion of the note 1632 is between the cassette 1602 and the transport path 1610, light 1710B from emitter 1620B is blocked and prevented from reaching detector 1628. Note sensing logic 1402 obtains signals from detector 1628B that indicates when detector 1628B is receiving, or not receiving, a signal from emitter 1620B. In an example embodiment, the light system 1800 comprises a plurality of emitters similar to the light system 1700 described in FIG. 17.

Figure 19:
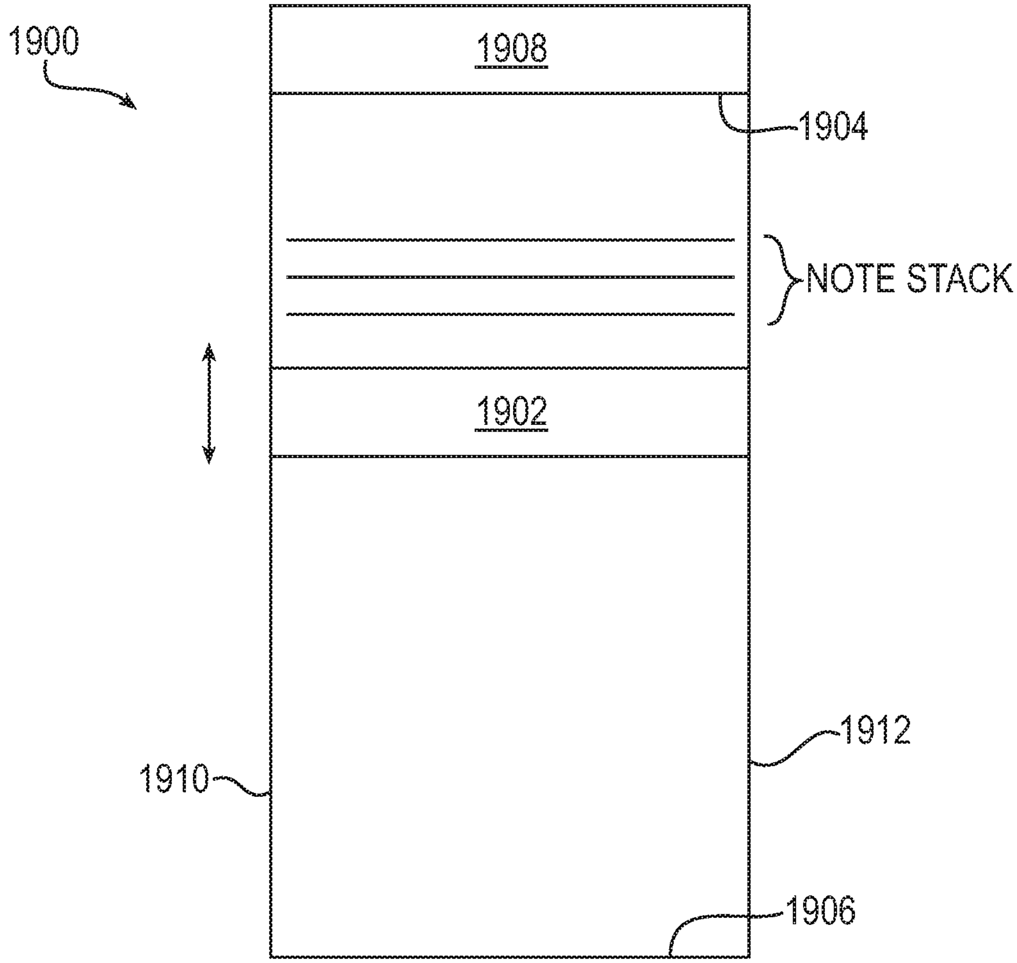
FIG. 19 is a simplified cutaway block diagram illustrating an example of the internal components of a cassette upon which an example embodiment may be implemented.

FIG. 19 is a simplified cutaway block diagram illustrating an example of a cassette 1900 upon which an example embodiment may be implemented. Cassette 1900 can be designed to fit in slots 410 of cassette module 400 described in FIG. 4. The cassette comprises a push plate 1902 that is operable to urge currency notes towards an upper surface 1904. The push plate 1902 may move towards the bottom 1906 of the cassette as notes are added and towards the top surface of the cassette 1904 as notes are removed. At the upper surface 1904 of the cassette 1900 is a feed wheel and thumper wheel assembly 1908. The cassette further comprises a plurality of surfaces that extend from the top surface to the bottom surface. In the illustrated example are a front surface 1910 and a rear surface 1912.

In an example embodiment that will be described herein infra, the cassette may have an additional chamber for an ink staining system which does not diminish the capacity of the note. In another example embodiment that will be described herein infra, the push plate is coupled with a torsion spring. In still yet another example embodiment that will be described herein infra, the feed wheel and thumper wheel assembly 1908 employ a timing technique that will be described in further detail herein.

Figure 20:
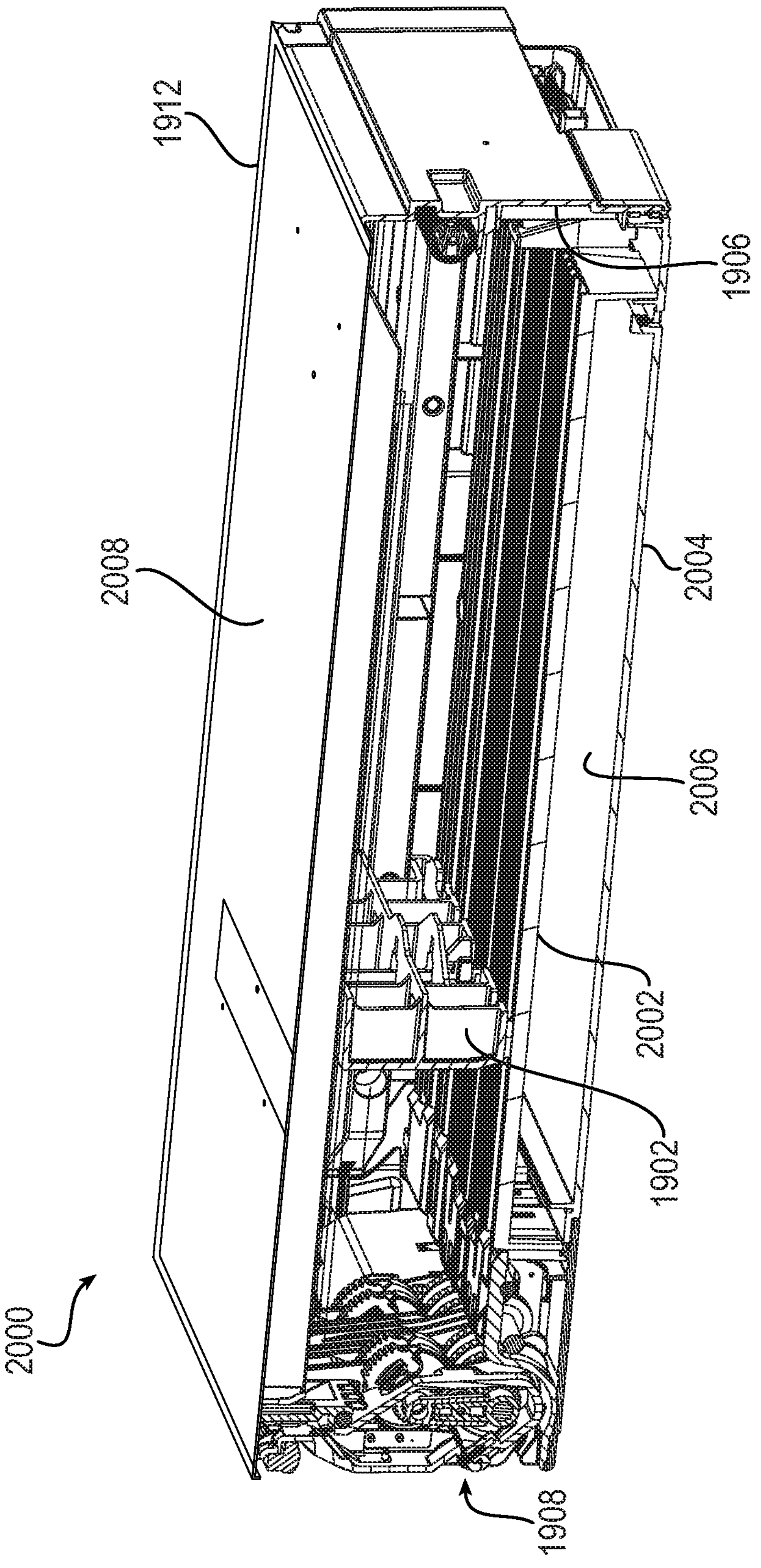
FIG. 20 is a perspective, cutaway view of a cassette that allows for the deployment of an ink staining system without diminishing the capacity of the cassette.

FIG. 20 is an isometric view of a cassette 2000 that allows for the deployment of an ink staining system without diminishing the capacity of the cassette. In the illustrated example, the cassette comprises a left surface 2004 and a right surface 2008. A floor 2002 is positioned between the left surface 2004 and the the push plate 1902 creating a cavity 2006 where the ink staining system may be deployed. The ink staining system is operable to stain currency notes in the cassette upon detection of tampering.

In the illustrated example, the cavity 2006 is U shaped, however, those skilled in the art can readily appreciate that the cavity 2006 may be any suitable shape, thus the example embodiments described herein should not be construed as limited to any particular shape. Moreover, those skilled in the art should readily appreciate that the floor 2002 while illustrated as being between the left surface 2004 and the push plate 1902, can be located between any surface 1910, 1912, 2004, 2008 and the push plate 1902. As those skilled in the art can readily appreciate, deploying the ink staining system inside the cavity 2006 that is adjacent to the push plate 1902 does not decrease the amount of notes that can be stored within the cassette 2000, as opposed to deploying the ink stain system underneath the push plate 1902 near the bottom 1906 of the cassette 2000.

Figure 21:
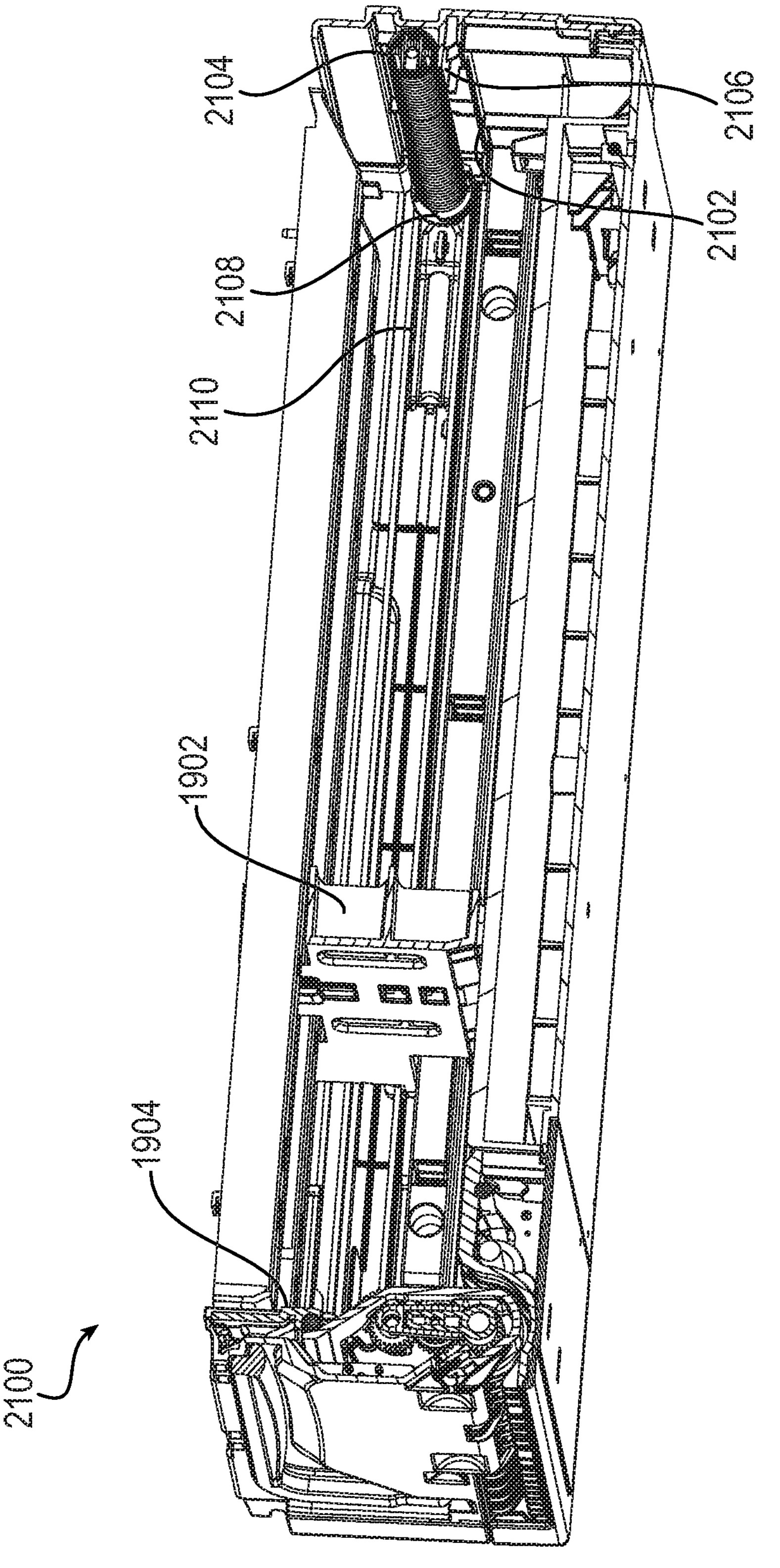
FIG. 21 is an isometric view of a cassette having a push plate coupled with a torsion spring.

FIG. 21 is a perspective view of a cassette 2100 having a push plate 1902 coupled with a torsion spring 2102. The torsion spring 2102 is coupled with rod 2104 and levers 2106. The rod 2104 is coupled with a lower pulley 2108 that are coupled by a belt 2110 to an upper pulley 2112 (not shown in FIG. 21, see e.g., FIGS. 22 and 23). The torsion spring 2102 biases the rod 2104 so that the rod urges the push plate 1902 via the belt 2110 towards the upper surface 1904 of the cassette 2100. An aspect of this example embodiment is a force is maintained on the push plate 1902 towards the upper surface 1904 of the cassette 2100 which will maintain a pressure on any notes in the cassette 2100 and protect the integrity of the note stack (see e.g., FIG. 20) by keeping the notes pressed between the push plate 1902 and the upper surface 1904.

Figure 22:
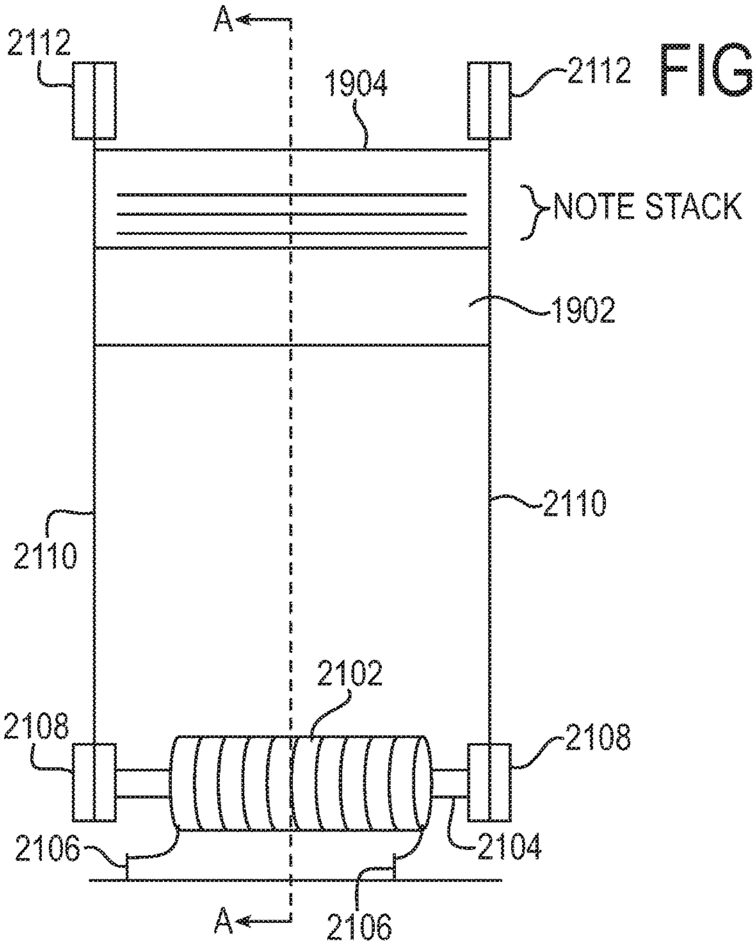
FIG. 22 is a side view of the cassette illustrated in FIG. 16.

FIG. 22 is a side view of the cassette 2100 illustrated in FIG. 21 In this example embodiment, two belts 2110 are coupled with lower pulleys 2108 and upper pulleys 2112. Although the illustrated example has two belts 2110 coupled to two lower pulleys 2108 and two upper pulleys 2112, those skilled in the art should readily appreciate that the number of belts and pulleys selected were merely for ease of illustration and that some embodiments may only have a single belt coupled to an upper and lower pulley whereas other example embodiments may have any physical realizable number of belts coupled with upper and lower pulleys.

Figure 23:
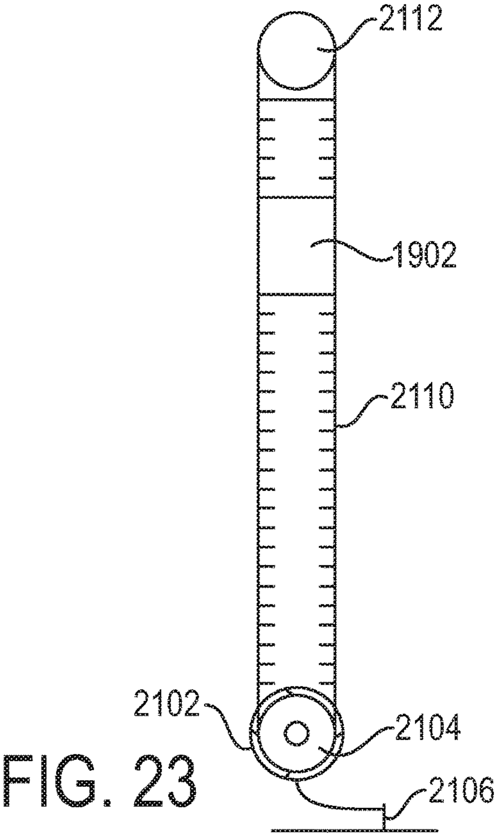
FIG. 23 is a cutaway view of the cassette illustrated in FIG. 17 along A-A.

FIG. 23 is a cutaway view of the cassette illustrated in FIG. 17 along A-A. In an example embodiment, the belt 2110 may have teeth for engaging the lower pulley 2108, push plate 1902, and upper pulley 2112. Any suitable technique may be employed for coupling the torsion spring 2102 to the rod 2104. As those skilled in the art can readily appreciate, upon installing the rod 2104 into the cassette, the torsion spring may be wound and thus transmit a force onto the rod 2104 which will urge the push plate 1402 towards the upper surface.

Figure 24:
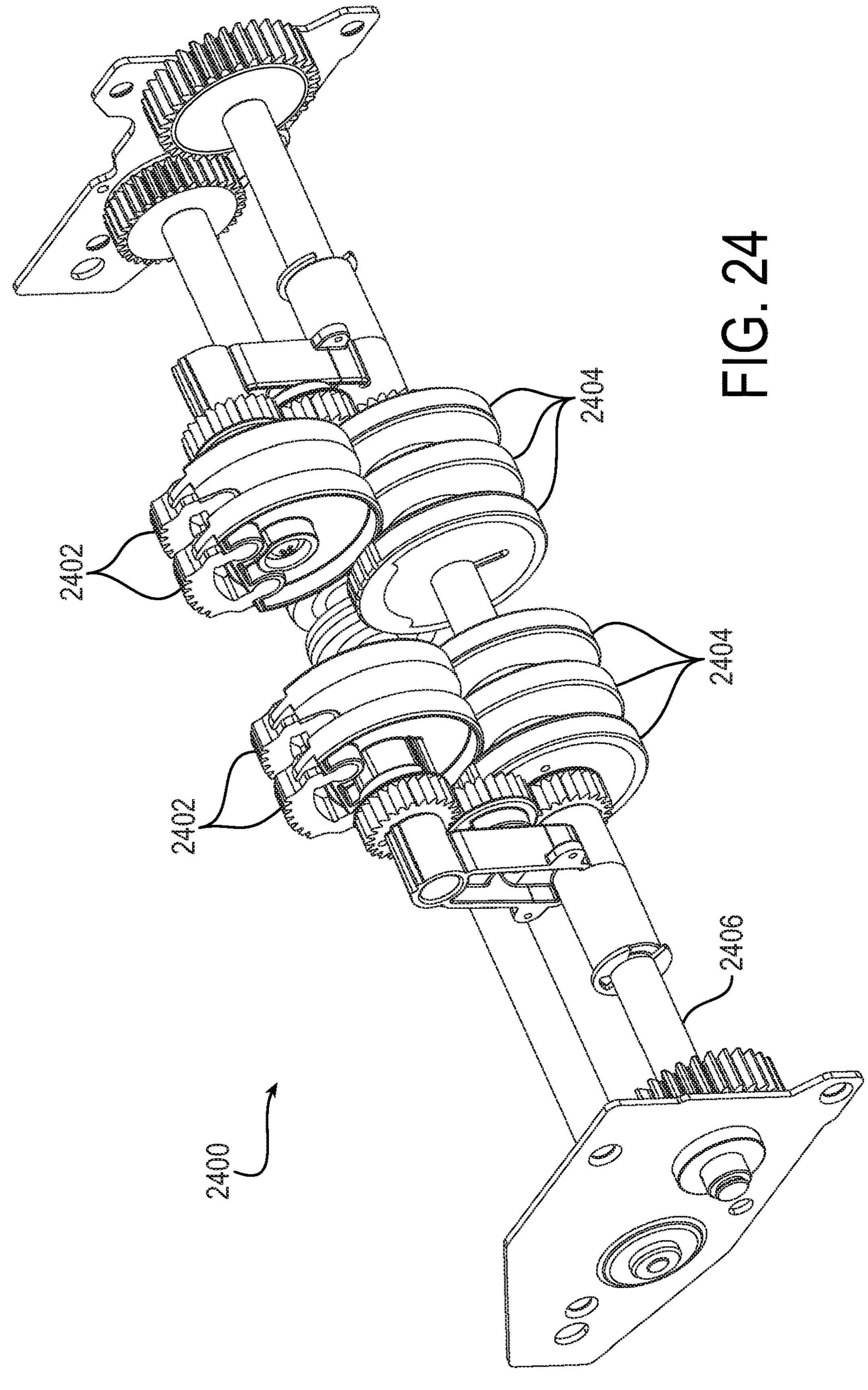
FIG. 24 is an isometric view of a thumper and feed wheel assembly in accordance with an example embodiment.

FIG. 24 is an isometric view of a thumper and feed wheel assembly 2400 in accordance with an example embodiment. The thumper and feed wheel assembly 2400 comprises thumper wheels 2402 that are timed with feed wheels 2404 (as will be explained in more detail herein infra). The feed wheels 2404 are mounted on a feed wheel shaft 2406.

Figure 25:
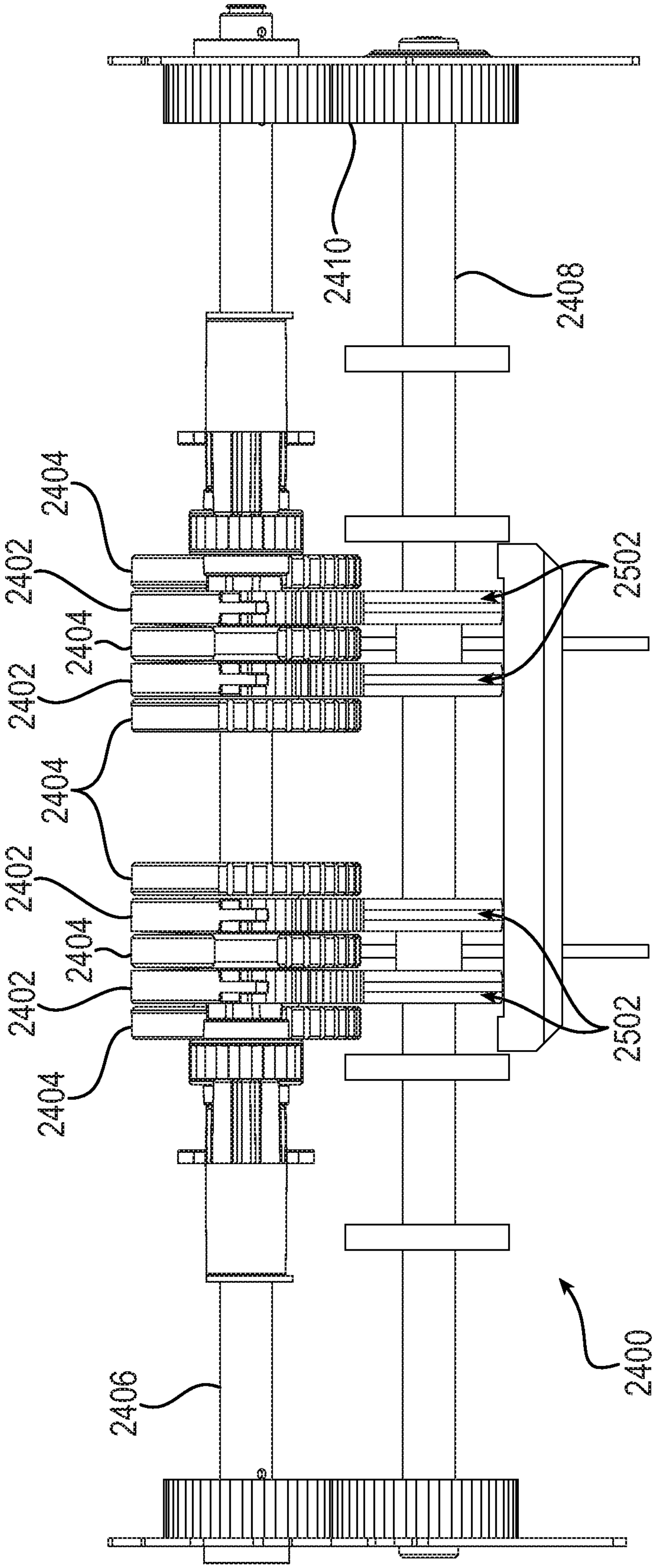
FIG. 25 is a top bottom view of the thumper and feed wheel assembly described in FIG. 19.
Figure 26:
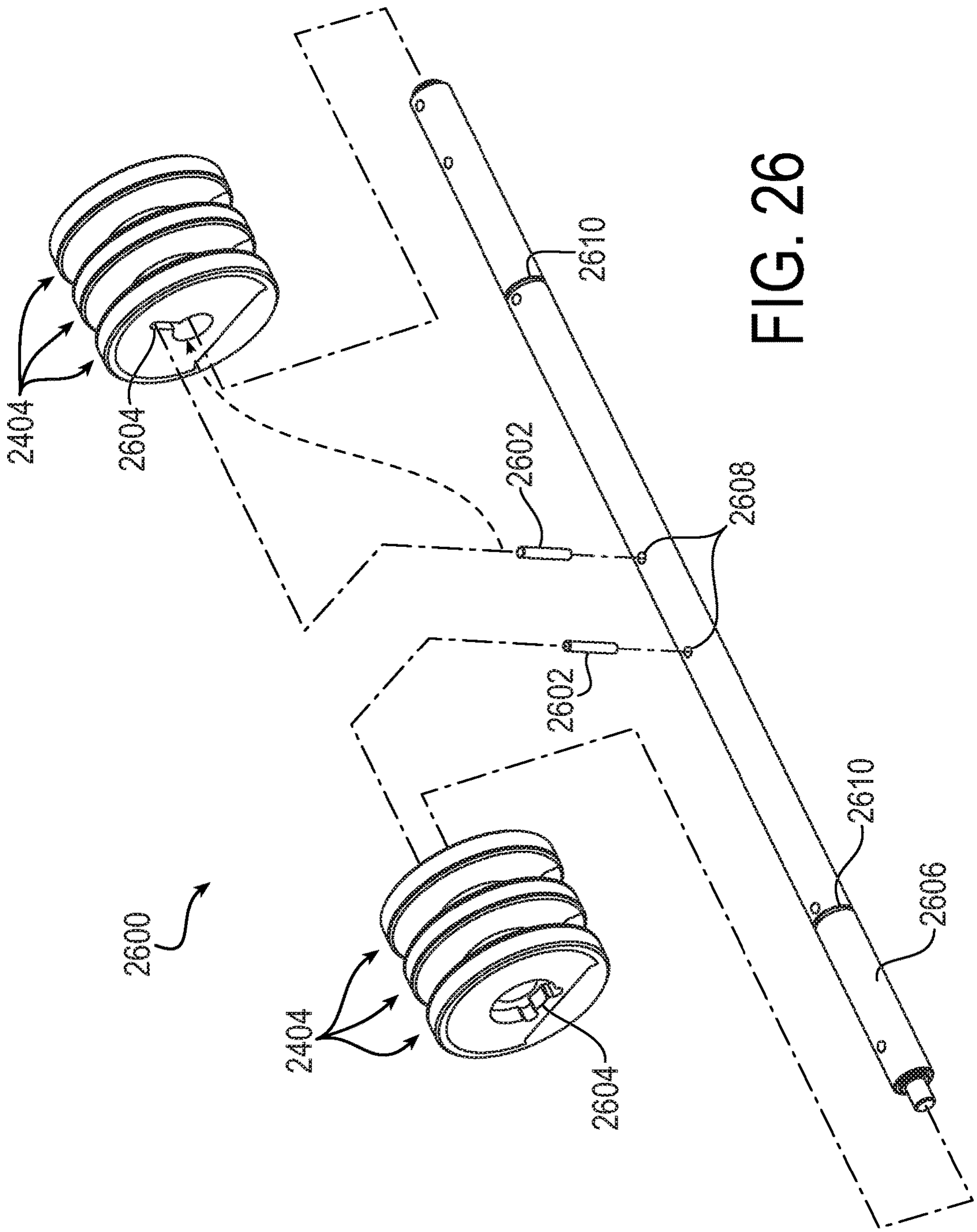
FIG. 26 is an exploded, isometric view of the feed wheel sub-assembly of the thumper and feed wheel assembly illustrated in FIG. 19.

FIG. 25 is a top bottom view of the thumper and feed wheel assembly 2400 described in FIG. 24. Stripper wheels 2502 are mounted on a stripper shaft 2408 that is coupled via a clutch 2410 with the feed wheel shaft 2406. The thumper wheels 2402 and feed wheels 2404 work together, whereas the stripper wheels 2502 are clutched to stop when a note is leaving the cassette (e.g., outbound) to prevent duplicate notes from leaving the cassette. The stripper wheels 2502 move with the feed wheels 2404 when notes are being inserted into the cassette, FIG. 26 is an exploded, isometric view of the feed wheel sub-assembly 2600 of the thumper and feed wheel assembly 2400 illustrated in FIG. 24. Dowel pins 2602 engage slots 2604 in feed wheels 2404. The dowel pins 2602 are inserted into holes 2608 in feed wheel shaft 2606. The dowel pins 2602 align the feed wheels 2404 so that the feed wheels 2404 and thumper wheels 2402 are correctly timed.

Figure 27:
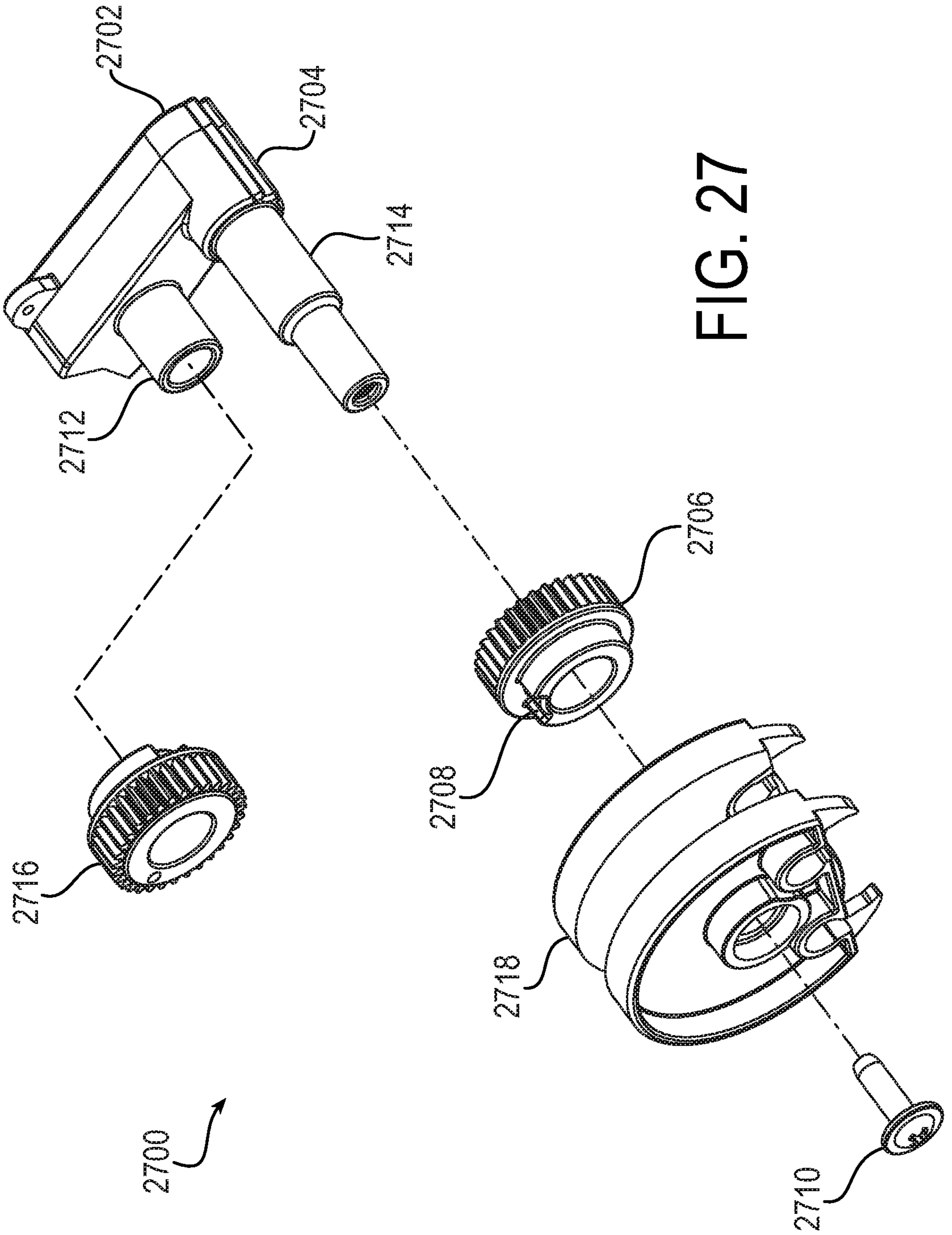
FIG. 27 is an exploded, isometric view of the thumper wheel sub-assembly of the thumper and feed wheel assembly illustrated in FIG. 19.

FIG. 27 is an exploded, isometric view of the thumper wheel sub-assembly 2700 of the thumper and feed wheel assembly 2400 illustrated in FIG. 24. The sub-assembly 2700 comprises a thumper body 2702 with a timing slot (or groove) 2704, the use of which will be explained in more detail herein infra. A thumper gear 2706 with a notch 2708 to is operable engage a tooth (not shown) thump roller 2718 to facilitate correct liming of the thumper wheels 2402 to the feed wheels 2404. The thumper gear 2706 and thumper roller 2718 are mounted onto mounting surface 2714 of thumper body 2702 and held in place by a fastener 2710. An intermediate gear 2716 is mounted onto surface 2712 of the thumper body 2702.

Figure 28:
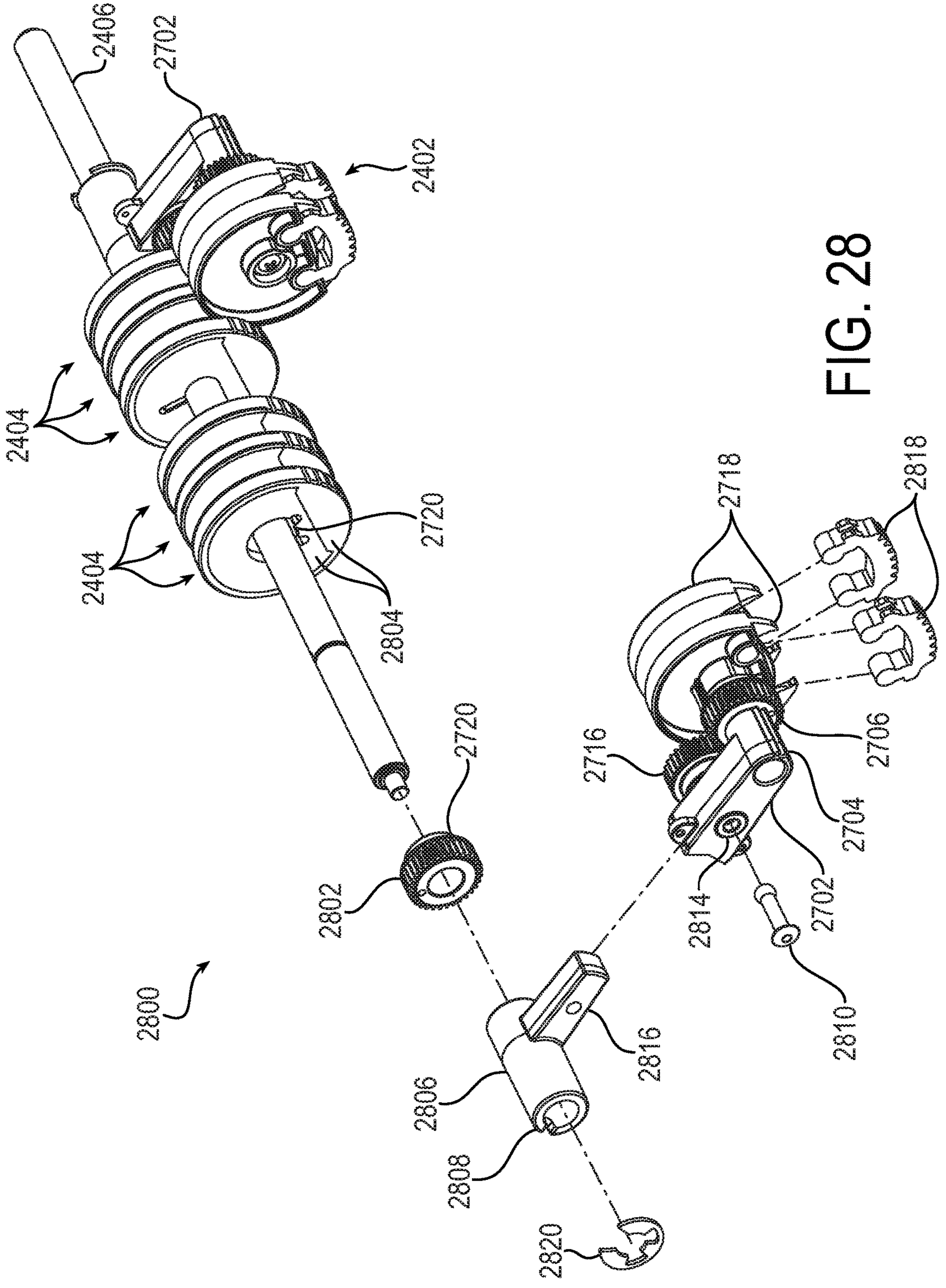
FIG. 28 is an exploded, isometric view of thumper wheel body sub-assembly and thumper arm oriented along the feed wheel shaft.

FIG. 28 is an exploded, isometric view of thumper wheel body sub-assembly 2800 and thumper arm 2806 oriented along the feed wheel shaft 2406. Feed wheel gear 2802 is mounted onto shaft 2406 and engages teeth 2804 in feed wheels 2404 to facilitate the correct timing of the feed wheels 2404 and thumper wheels 2402. The thumper arm 2806 that has a timing slot 2808 (the function of which will be described in more detail herein infra) is mounted on shaft 2406 after the feed wheel gear 2802. The thumper body 2702 is mounted onto thumper arm 2806. Fastener 2810 engages hole 2814 in thumper body 2702 and hole 2816 in thumper arm 2806 and intermediate gear 2716. The timing of the thumper wheels 2402 and feed wheels 2404 will be maintained as long as the gears are meshed. Thumpers 2818 are mounted onto thumper rollers 2718 forming thumper wheels 2402. An e-ring 2820 is installed at the end of shaft 2406 to hold the thumper arm 2806 in place.

Figure 29:
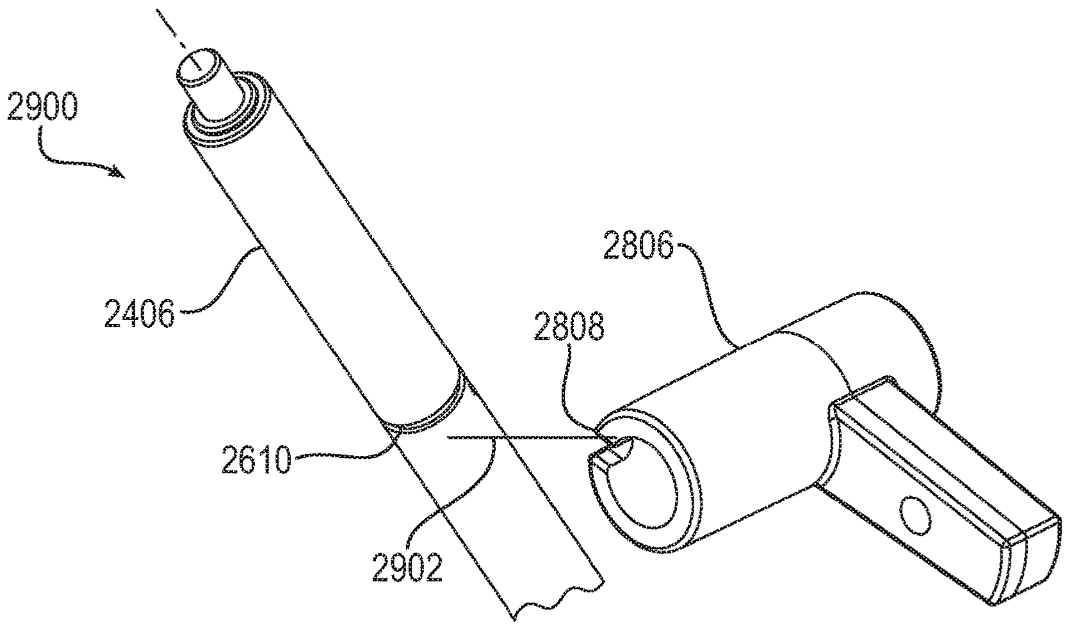
FIG. 29 is an isometric diagram illustrating an example of the placement of a temporary pin between the feed wheel shaft and the thumper arm.
Figure 30:
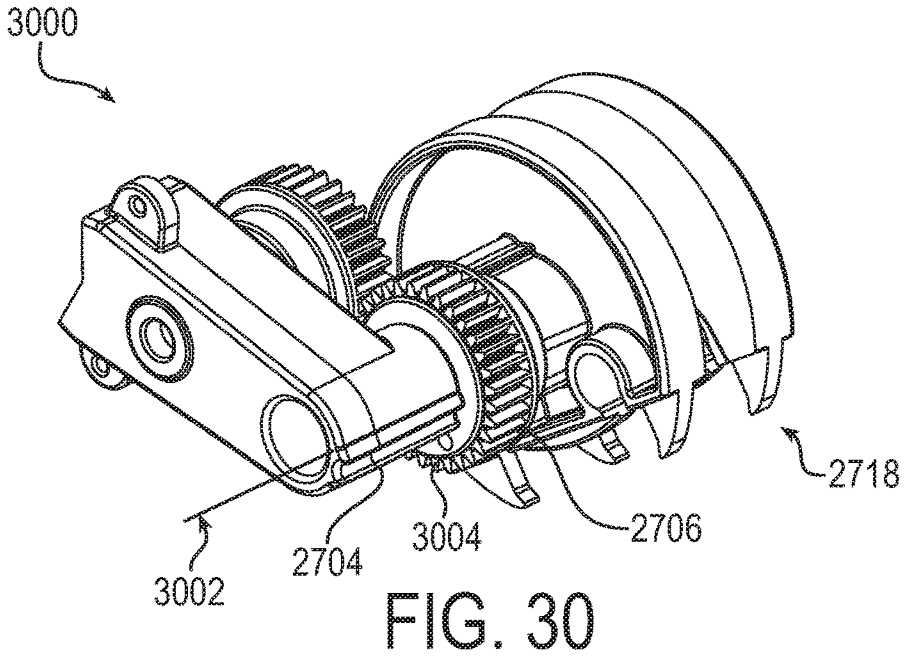
FIG. 30 is an isometric diagram illustrating an example of the placement of a temporary pin between the thumper body and thumper gear.
Figure 31:
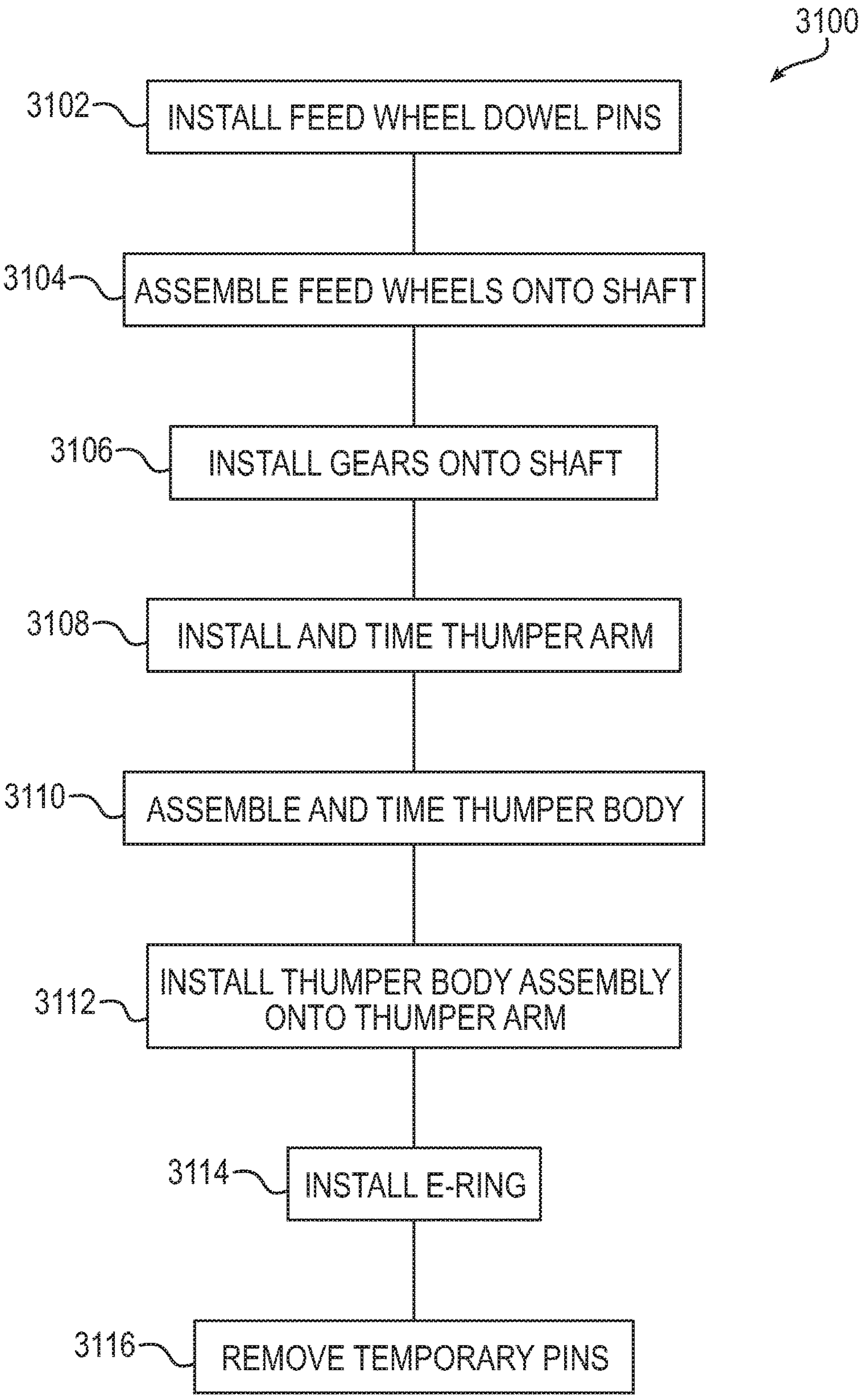
FIG. 31 is a method of timing the thumper and feed wheel assembly.

FIG. 29 is an isometric diagram illustrating an example 2900 of the placement of the first temporary pin 2902 between the holes 2610 of the feed wheel shaft 2406 and the timing slot 2808 of the thumper arm 2806 that is described in the methodology 3100 of FIG. 31. FIG. 30 is an isometric diagram illustrating an example 3000 of the placement of a temporary pin 3002 between the timing groove 2704 of the thumper body and a timing hole 3004 of the thumper gear 2706 that is described in the methodology 3100 of FIG. 31.

In view of the foregoing structural and functional features described above, a methodology 3100 for timing the thumper and feed wheel assembly in accordance with an example embodiment will be better appreciated with reference to FIG. 31. While, for purposes of simplicity of explanation, the methodology 3100 of FIG. 31 is shown and described as executing serially, it is to be understood and appreciated that the example embodiment is not limited by the illustrated order, as some aspects could occur in different orders and/or concurrently with other aspects from that shown and described herein. Moreover, not all illustrated features may be required to implement a methodology At 3102, feed wheel dowel pins are installed into holes in the feed wheel shaft. The feed wheel dowel pins properly align the feed wheels for timing with the thumper wheels.

At 3104, a feed wheel is installed onto the feed wheel shaft. The feed wheels have a cut out area which is aligned with the dowel pins. This maintains proper orientation of the feed wheel for timing with a thumper wheel.

At 3106 a feed wheel gear is installed onto the feed wheel shaft. The feed wheel gear is oriented to align with a tooth on the feed wheel.

At 3108, the thumper arm is installed onto the feed wheel shaft. The thumper arm has a timing slot. The timing slot of the thumper arm is aligned with a timing hole in the feed wheel shaft. A first temporary pin is inserted through the thumper arm timing slot and the hole in the feed wheel shaft to hold the thumper arm in proper timing alignment. FIG. 29 illustrates an example 2900 of the placement of the first temporary pin 2902 between the holes 2610 of the feed wheel shaft 2406 and the timing slot 2808 of the thumper arm 2806.

At 3110, the thumper body is assembled and timed. The assembly and timing of the thumper body comprises inserting a thumper wheel gear and a thumper roller onto a first mounting surface of the thumper body. A timing groove in the thumper body is aligned with a timing hole in the thumper gear. A second temporary pin is employed to hold the timing groove of the thumper body in alignment with the timing hole of the thumper gear. An intermediate gear is installed on a second mounting surface. FIG. 30 illustrates an example 3000 of the placement of a temporary pin 3002 between the timing groove 2704 of the thumper body and a timing hole 3004 of the thumper gear 2706.

At 3112, the timed thumper assembly is installed onto the thumper arm. A fastener, such as a rivet, is employed to fasten the timed thumper assembly to the thumper arm, which is also timed with the feed wheel shaft. Upon being fastened, timing of the thumper and feed wheel assembly will be maintained as long as the feed wheel gear, intermediate gear, and thumper wheel gear are meshed.

At 3114, an e-ring is installed onto the feed wheel shaft. The e-ring will lock the sub assemblies (e.g., feed wheels, thumper arm and thumper body) onto the feed wheel shaft.

At 3116, the first and second temporary pins are removed. The first and second temporary pins are employed to time thumper arm and thumper body assembly. Once the thumper arm and thumper body assembly are fastened together, the first and second temporary pins are no longer needed to maintain the timing of the thumper wheels to the feed wheels.

Figure 32:
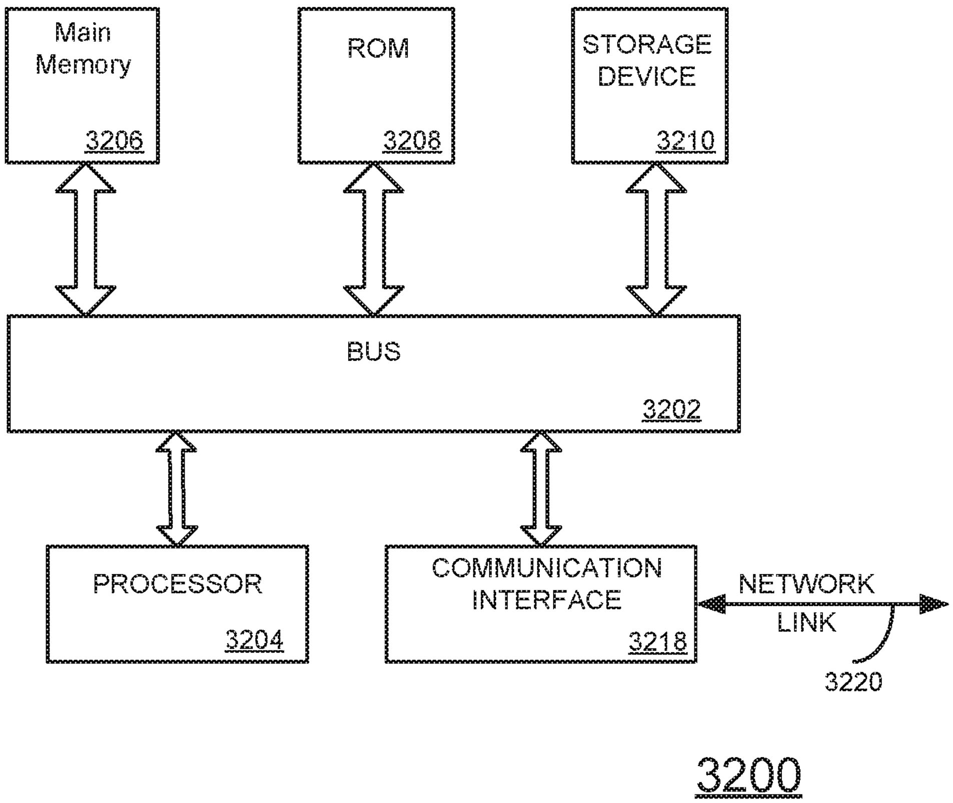
FIG. 32 is a block diagram of a computer system upon which an example embodiment may be implemented.

FIG. 32 is a block diagram that illustrates a computer system 3200 upon which an example embodiment may be implemented. Computer system 3200 may be employed to implement the note sensing logic 1402 (FIGS. 14 and 16-8) and/or skew calculating logic 1504 (FIG. 15).

Computer system 3200 includes a bus 3202 or other communication mechanism for communicating information and a processor 3204 coupled with bus 3202 for processing information. Computer system 3200 also includes a main memory 3206, such as random access memory (RAM) or other dynamic storage device coupled to bus 3202 for storing information and instructions to be executed by processor 3204. Main memory 3206 also may be used for storing a temporary variable or other intermediate information during execution of instructions to be executed by processor 3204. Computer system 3200 further includes a read only memory (ROM) 3208 or other static storage device coupled to bus 3202 for storing static information and instructions for processor 3204. A storage device 3210, such as a magnetic disk or optical disk, is provided and coupled to bus 3202 for storing information and instructions.

An aspect of the example embodiment is related to the use of computer system 3200 for note sensing and/or skew calculating. According to an example embodiment, note sensing and/or skew calculating is provided by computer system 3200 in response to processor 3204 executing one or more sequences of one or more instructions contained in main memory 3206. Such instructions may be read into main memory 3206 from another computer-readable medium, such as storage device 3210. Execution of the sequence of instructions contained in main memory 3206 causes processor 3204 to perform the process steps described herein. One or more processors in a multi-processing arrangement may also be employed to execute the sequences of instructions contained in main memory 3206. In alternative embodiments, hard-wired circuitry may be used in place of or in combination with software instructions to implement an example embodiment. Thus, embodiments described herein are not limited to any specific combination of hardware circuitry and software.

The term "computer-readable medium" as used herein refers to any medium that participates in providing instructions to processor 3204 for execution. Such a medium may take many forms, including but not limited to non-volatile media. Non-volatile media include for example optical or magnetic disks, such as storage device 3210. Common forms of computer-readable media include for example floppy disk, a flexible disk, hard disk, magnetic cards, paper tape, any other physical medium with patterns of holes, a RAM, a PROM, an EPROM, a FLASHPROM, CD, DVD or any other memory chip or cartridge, or any other medium from which a computer can read.

Computer system 3200 also includes a communication interface 3218 coupled to bus 3202. Communication interface 3218 provides a two-way data communication coupling computer system 3200 with a network link 3220 that can be coupled to other devices (not shown).

For example, communication interface 3218 may be a local area network (LAN) card to provide a data communication connection to a compatible LAN. As another example, communication interface 3218 may be an integrated services digital network (ISDN) card or a modem to provide a data communication connection to a corresponding type of telephone line. Wireless links may also be implemented. In any such implementation, communication interface 3218 sends and receives electrical, electromagnetic, and/or optical signals that carry digital data streams representing various types of information. For example, upon detecting a fault condition, computer system 3200 may employ communication interface 3218 to notify another processor (for example an automated teller machine's processor) of the fault condition. In an example embodiment, the emitters and detectors described in FIGS. 14-18 may coupled with the bus 3202 and/or communication interface 3218.

Described above are example embodiments. It is, of course, not possible to describe every conceivable combination of components or methodologies for purposes of describing the example embodiments, but one of ordinary skill in the art will recognize that many further combinations and permutations of the example embodiments are possible. Accordingly, it is intended to embrace all such alterations, modifications and variations that fall within the spirit and scope of any claims filed in applications claiming priority hereto interpreted in accordance with the breadth to which they are fairly, legally and equitably entitled.

The invention claimed is:

1. An apparatus, comprising:
- an automated banking machine, the automated banking machine comprises:
- a user interface,
- a front service door with a first lock for gaining access to the interior of the automated banking machine;
- a cassette module operable to hold cassettes containing currency notes for dispensing by the automated banking machine located within the interior of the automated banking machine; and
- a divert cassette with a divert cassette door with a second lock for gaining access to the interior of the divert cassette;
- wherein the divert cassette is positioned within the cassette module adjacent to the front service door; the divert cassette blocking access to the cassettes containing currency notes for dispensing by the automated banking machine;
- wherein the divert cassette comprises a separator that divides the divert cassette into a first compartment and a second compartment;
- the divert cassette further comprises a valve located inside the divert cassette that is operable to direct retracted and diverted notes to the first compartment and second compartment respectively.

2. The apparatus set forth in claim 1, wherein the divert cassette is positioned where the divert cassette door is operable to be opened while the cassette module is located within the automated banking machine and the door for gaining access to the interior of the automated banking machine is in the open position.

3. The apparatus set forth in claim 1, wherein the separator comprises a finger hole; and wherein the finger hole allows a user to engage the separator within the divert cassette and rotate the separator to gain access into the first compartment.

4. The apparatus set forth in claim 1, wherein the first compartment is for holding diverted notes; and wherein the second compartment is for holding retracted notes.

5. The apparatus set forth in claim 1, the automated banking machine comprises a slide that enables the cassette module to slide outside of the machine.

* * * * *